(12) United States Patent
Kumai et al.

(10) Patent No.: US 10,093,316 B2
(45) Date of Patent: Oct. 9, 2018

(54) VEHICLE TRAVELING CONTROL DEVICE

(71) Applicant: TOYOTA JIDOSHA KABUSHIKI KAISHA, Toyota-shi, Aichi-ken (JP)

(72) Inventors: Yuichi Kumai, Gotenba (JP); Jun Sato, Susono (JP); Masaki Matsunaga, Odawara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 66 days.

(21) Appl. No.: 15/193,555

(22) Filed: Jun. 27, 2016

(65) Prior Publication Data

US 2017/0001642 A1     Jan. 5, 2017

(30) Foreign Application Priority Data

Jun. 30, 2015   (JP) ................. 2015-131602

(51) Int. Cl.
*B62D 6/00* (2006.01)
*B60W 30/16* (2012.01)
*B62D 15/02* (2006.01)

(52) U.S. Cl.
CPC .......... *B60W 30/16* (2013.01); *B62D 15/025* (2013.01)

(58) Field of Classification Search
USPC .......................................... 701/41
See application file for complete search history.

(56) References Cited

U.S. PATENT DOCUMENTS

| 2007/0233343 A1 | 10/2007 | Saito et al. |
| 2011/0231063 A1 | 9/2011 | Kim |
| 2012/0065863 A1 | 3/2012 | Takagi et al. |

FOREIGN PATENT DOCUMENTS

| CN | 102365195 A | 2/2012 |
| JP | 61-249839 A | 11/1986 |
| JP | 2007-261451 A | 10/2007 |
| JP | 2002-225689 A | 8/2012 |
| WO | 2010/116499 A1 | 10/2010 |

*Primary Examiner* — Adam D Tissot
(74) *Attorney, Agent, or Firm* — Sughrue Mion, PLLC

(57) ABSTRACT

A device performs speed control, determines the start and the end of an intervention operation, interrupts the speed control when an intervention operation is started, selects a correction candidate from a target speed and a target inter-vehicle distance based on the presence of a preceding vehicle and on the speed difference between the vehicle and the preceding vehicle, determines whether there is a change in the vehicle speed or in the inter-vehicle distance in a determination period, determines whether there is a difference between the target speed and the vehicle speed when the intervention is ended or between the target inter-vehicle distance and the inter-vehicle distance when the intervention is ended, and corrects the target speed or the target inter-vehicle distance under a predetermined condition. After the intervention operation is ended, the device restarts the speed control using the corrected target speed or the corrected target inter-vehicle distance.

3 Claims, 12 Drawing Sheets

VEHICLE TRAVELING CONTROL DEVICE

INCORPORATION BY REFERENCE

The disclosure of Japanese Patent Application No. 2015-131602 filed on Jun. 30, 2015 including the specification, drawings and abstract is incorporated herein by reference in its entirety.

BACKGROUND OF THE INVENTION

1. Field of the Invention

The present invention relates to a vehicle traveling control device.

2. Description of Related Art

Japanese Patent Application Publication No. 2002-225689 (JP 2002-225689 A) describes a vehicle traveling control device that allows the driver to intervene in the traveling control while the traveling control of a vehicle is being performed. When the driver performs the braking operation to intervene in the traveling control while driving assistance is being provided, the device described in Japanese Patent Application Publication No. 2002-225689 (JP 2002-225689 A) adds the braking force, corresponding to the driver's braking operation, to the original target braking force and sets the resulting total braking force as the operation target braking force for use in the braking control of the vehicle. The device described in Japanese Patent Application Publication No. 2002-225689 (JP 2002-225689 A) performs the braking control of the vehicle based on the operation target braking force after the driver's intervention is ended. In some other cases, however, the device described in Japanese Patent Application Publication No. 2002-225689 (JP 2002-225689 A) performs the braking control of the vehicle based on the original target braking force after the driver's intervention is ended.

However, Japanese Patent Application Publication No. 2002-225689 (JP 2002-225689 A) does not disclose which target value, either the original target value or the target value that is set when the driver intervenes, is to be used to restart the traveling control after the driver's intervention is ended. Therefore, when the driver wants to use the braking control based on the target braking force after the intervention is ended, the braking control is sometimes performed based on the operation target braking force calculated by adding the braking force, generated according to the driver's braking operation, to the target braking force, with the result that the braking control is performed against the driver's intention. In this technical field, it is desired to provide a vehicle traveling control device capable of performing traveling control that realizes the driver's intention when the interrupted traveling control is restarted.

SUMMARY OF THE INVENTION

A vehicle traveling control device that performs traveling control of a vehicle in a first aspect of the present invention includes an other-vehicle recognition portion configured to recognize presence of a preceding vehicle traveling in a traveling lane ahead of the vehicle; an external situation recognition portion configured to recognize a speed difference between the vehicle and the preceding vehicle and an inter-vehicle distance between the vehicle and the preceding vehicle when the other-vehicle recognition portion recognizes the preceding vehicle; a traveling state recognition portion configured to recognize a speed of the vehicle; a vehicle control portion configured to perform speed control of the vehicle using the speed of the vehicle and a target speed that is set in advance and using the inter-vehicle distance and a target inter-vehicle distance that is set in advance; an intervention determination portion configured to determine a start and an end of an intervention operation, performed by a driver of the vehicle, in the speed control; an intervention control portion configured to cause the vehicle control portion to interrupt the speed control when the intervention determination portion determines the start of the driver's intervention operation in the speed control, and causes the vehicle control portion to restart the speed control when the intervention determination portion determines the end of the driver's intervention operation in the speed control; a candidate selection portion configured to select a correction candidate from the target speed and the target inter-vehicle distance based on the presence of the preceding vehicle and on the speed difference between the vehicle and the preceding vehicle; a change determination portion configured to determine whether there is a change in the speed of the vehicle or there is a change in the inter-vehicle distance in a first determination period, the first determination period being a period from a predetermined time before the end of the driver's intervention operation in the speed control to the end of the driver's intervention operation in the speed control; a difference determination portion determine whether there is a difference between the target speed and the speed of the vehicle when the driver's intervention operation in the speed control is ended or whether there is a difference between the target inter-vehicle distance and the inter-vehicle distance when the driver's intervention operation in the speed control is ended; and a target correction portion configured to correct the target speed or the target inter-vehicle distance, wherein if the candidate selection portion selects the target speed as the correction candidate, the change determination portion determines whether an amount of change in the speed of the vehicle in the first determination period is equal to or smaller than a first speed threshold, the difference determination portion determines whether a difference between the speed of the vehicle when the driver's intervention operation in the speed control is ended and the target speed is equal to or larger than a second speed threshold, and the target correction portion corrects the target speed to the speed of the vehicle when the driver's intervention operation in the speed control is ended if the change determination portion determines that the amount of change in the speed of the vehicle in the first determination period is equal to or smaller than the first speed threshold and if the difference determination portion determines that the difference between the target speed and the speed of the vehicle when the driver's intervention operation in the speed control is ended is equal to or larger than the second speed threshold, and if the candidate selection portion selects the target inter-vehicle distance as the correction candidate, the change determination portion determines whether an amount of change in the inter-vehicle distance in the first determination period is equal to or smaller than a first inter-vehicle distance threshold, the difference determination portion determines whether a difference between the target inter-vehicle distance and the inter-vehicle distance when the driver's intervention operation in the speed control is ended is equal to or larger than a second inter-vehicle distance threshold, and the target correction portion corrects the target inter-vehicle distance to the inter-vehicle distance when the driver's intervention operation in the speed control is ended if the change determination portion determines that the amount of change in the inter-vehicle distance in the first determination period is equal to or smaller than the first inter-vehicle distance threshold and if the difference determination portion determines that the difference between the inter-vehicle distance when the driver's intervention operation in the speed control is ended and the target inter-vehicle distance is equal to or larger than the second inter-vehicle distance threshold and if the intervention determination portion determines that the driver's intervention operation in the speed control is ended, the vehicle control portion restarts the speed control using the target speed or the target inter-vehicle distance corrected by the target correction portion.

When the speed control is performed using the target speed, the target inter-vehicle distance, the speed of the vehicle, and the inter-vehicle distance and, during that speed control, the driver performs an intervention operation (acceleration/deceleration operation), this device determines which is to be changed by the intervention operation, either the speed of the vehicle or the inter-vehicle distance. For example, if there is no preceding vehicle or if the speed difference between the vehicle V and the preceding vehicle is not equal to or smaller than the predetermined speed, it is estimated that the intervention operation is performed to change the speed of the vehicle. Therefore, the candidate selection unit selects the target speed as the correction candidate. If the speed difference between the vehicle and the preceding vehicle is equal to or smaller than the predetermined speed, it is estimated that the intervention operation is performed to intentionally change the inter-vehicle distance. Therefore, the candidate selection unit selects the target inter-vehicle distance as the correction candidate. In this way, when performing the speed control, this device can select the target speed or the target inter-vehicle distance, which corresponds respectively to the speed of the vehicle or the inter-vehicle distance to be changed by the driver, as the correction candidate, based on the presence of a preceding vehicle and the speed difference between the vehicle V and a preceding vehicle.

If it is determined that the target speed is the correction candidate, the processing is performed as follows. If the change determination unit determines that the amount of change in the speed of the vehicle in the first determination period, from the predetermined time before the end of the driver's intervention operation (acceleration/deceleration operation) to the end of the driver's intervention operation, is equal to or smaller than the first speed threshold and if the difference determination unit determines that the difference between the speed of the vehicle recognized when the driver's intervention operation is ended and the target speed is equal to or larger than the second speed threshold, the target correction unit corrects the target speed to the speed of the vehicle recognized when the intervention operation is ended. If the amount of change in the speed of the vehicle in the first determination period is equal to or smaller than the first speed threshold, it is estimated that the intervention operation is ended because the speed becomes the stable speed according to the driver's intention. If the difference between the stabilized speed and the target speed is equal to or larger than the second speed threshold, that difference means there is a difference between the speed of the vehicle and the target speed. This means that, if the above condition is satisfied, it is estimated that the intervention operation is not a temporary intervention operation for avoiding an obstacle but is an intervention performed intentionally by the driver to change the target speed of the travelling control. Therefore, if the above condition is satisfied, this vehicle traveling control device corrects the target speed to the speed of the vehicle recognized when the driver's intervention operation is ended, allowing the speed control to be performed according to the driver's intention when the interrupted speed control is restarted.

On the other hand, if it is determined that the target inter-vehicle distance is the correction candidate, the processing is performed as follows. If the change determination unit determines that the amount of change in the inter-vehicle distance in the first determination period, from the predetermined time before the end of the driver's intervention operation (acceleration/deceleration operation) to the end of the driver's intervention operation, is equal to or smaller than the first inter-vehicle distance threshold and if the difference determination unit determines that the difference between the inter-vehicle distance recognized when the driver's intervention operation is ended and the target inter-vehicle distance is equal to or larger than the second inter-vehicle distance threshold, the target correction unit corrects the target inter-vehicle distance to the inter-vehicle distance recognized when the intervention operation is ended. If the amount of change in the inter-vehicle distance in the first determination period is equal to or smaller than the first inter-vehicle distance threshold, it is estimated that the intervention operation is ended because the inter-vehicle distance becomes the stable inter-vehicle distance according to the driver's intention. If the difference between the stabilized inter-vehicle distance and the target inter-vehicle distance is equal to or larger than the second inter-vehicle distance threshold, that difference means that there is a difference between the inter-vehicle distance and the target inter-vehicle distance. This means that, if the above condition is satisfied, it is estimated that the intervention operation is not a temporary intervention operation for avoiding an obstacle but is an intervention performed intentionally by the driver to change the target inter-vehicle distance of the travelling control. Therefore, if the above condition is satisfied, this vehicle traveling control device corrects the target inter-vehicle distance to the inter-vehicle distance recognized when the driver's intervention operation is ended, allowing the speed control to be performed according to the driver's intention when the interrupted speed control is restarted.

In one embodiment, the external situation recognition unit may acquire a position of lane lines that are boundaries of the traveling lane of the vehicle, the traveling state recognition unit may recognize a lateral position of the vehicle in the traveling lane, the vehicle control unit may perform steering control using the lateral position of the vehicle and a target lateral position that is set in advance, the intervention determination unit may determine a start and an end of an intervention operation, performed by the driver of the vehicle, in the steering control, an intervention control unit may cause the vehicle control unit to interrupt the steering control when the intervention determination unit determines the start of the driver's intervention operation in the steering control, and causes the vehicle control unit to restart the steering control when the intervention determination unit determines the end of the driver's intervention operation in the steering control, and the candidate selection unit may select the target lateral position as the correction candidate based on the start of the intervention operation in the steering control. If the candidate selection unit selects the target lateral position as the correction candidate, the change determination unit may determine whether an amount of change in the lateral position of the vehicle in a second determination period is equal to or smaller than a first lateral position threshold, the second determination period being a period from a predetermined time before the end of the driver's intervention operation in the steering control to the end of the driver's intervention operation in the steering control, the difference determination unit may determine whether a difference between the target lateral position and the lateral position of the vehicle when the driver's intervention operation in the steering control is ended is equal to or larger than a second lateral position threshold, and the target correction unit may correct the target lateral position to the lateral position of the vehicle when the driver's intervention operation in the steering control is ended if the change determination unit determines that the amount of change in the lateral position of the vehicle in the second determination period is equal to or smaller than the first lateral position threshold and if the difference determination unit determines that the difference between the target lateral position and the lateral position of the vehicle when the driver's intervention operation in the steering control is ended is equal to or larger than the second lateral position threshold and, if the intervention determination unit determines that the driver's intervention operation in the steering control is ended, the vehicle control unit may restart the steering control using the target lateral position corrected by the target correction unit.

According to this vehicle traveling control device, if the change determination unit determines that the amount of change in the lateral position of the vehicle in the second determination period K, from the predetermined time before the end of the driver's intervention operation (steering operation) to the end of the driver's intervention operation, is equal to or smaller than the first lateral position threshold and if the difference determination unit determines that the difference between the lateral position recognized when the driver's intervention operation is ended and the target lateral position is equal to or larger than the second lateral position threshold, the target correction unit corrects the target lateral position to the lateral position of the vehicle recognized when the intervention operation is ended. If the amount of change in the lateral position of the vehicle in the second determination period is equal to or smaller than the first lateral position threshold, it is estimated that the intervention operation is ended because the lateral position becomes the stable lateral position according to the driver's intention. If the difference between the stabilized lateral position and the target lateral position is equal to or larger than the second lateral position threshold, that difference means that there is a difference between the lateral position of the vehicle and the target lateral position. This means that, if the above condition is satisfied, it is estimated that the intervention operation is not a temporary intervention operation for avoiding an obstacle but is an intervention performed intentionally by the driver to change the target lateral position of the travelling control. Therefore, if the above condition is satisfied, this vehicle traveling control device corrects the target lateral position to the lateral position of the vehicle recognized when the driver's intervention operation is ended, allowing the steering control to be performed according to the driver's intention when the interrupted steering control is restarted.

A vehicle traveling control device in a second aspect of the present invention includes: an external sensor that detects an external situation that is surrounding information on the vehicle; an internal sensor that detects information according to a traveling state of the vehicle; an actuator that performs traveling control of the vehicle; and an ECU configured to recognize presence of a preceding vehicle traveling in a traveling lane ahead of the vehicle based on the external situation detected by the external sensor, recognize a speed difference between the vehicle and the preceding vehicle and an inter-vehicle distance between the vehicle and the preceding vehicle when the preceding vehicle is recognized, recognize a speed of the vehicle based on the information detected by the internal sensor, perform speed control of the vehicle using the actuator based on the speed of the vehicle and a target speed that is set in advance and on the inter-vehicle distance and a target inter-vehicle distance that is set in advance, determine a start and an end of an intervention operation, performed by a driver of the vehicle, in the speed control, interrupt the speed control when it is determined that the driver's intervention operation in the speed control is started, and restarts the speed control when it is determined that the driver's intervention operation in the speed control is ended; select a correction candidate from the target speed and the target inter-vehicle distance based on the presence of the preceding vehicle and on the speed difference between the vehicle and the preceding vehicle, determine whether there is a change in the speed of the vehicle or there is a change in the inter-vehicle distance in a first determination period, the first determination period being a period from a predetermined time before the end of the driver's intervention operation in the speed control to the end of the driver's intervention operation in the speed control, determine whether there is a difference between the target speed and the speed of the vehicle when the driver's intervention operation in the speed control is ended or whether there is a difference between the target inter-vehicle distance and the inter-vehicle distance when the driver's intervention operation in the speed control is ended, and correct the target speed or the target inter-vehicle distance, wherein if the target speed is selected as the correction candidate, the ECU determines whether an amount of change in the speed of the vehicle in the first determination period is equal to or smaller than a first speed threshold, determines whether the difference between the speed of the vehicle when the driver's intervention operation in the speed control is ended and the target speed is equal to or larger than a second speed threshold, and corrects the target speed to the speed of the vehicle when the driver's intervention operation in the speed control is ended if it is determined that the amount of change in the speed of the vehicle in the first determination period is equal to or smaller than the first speed threshold and if it is determined that the difference between the target speed and the speed of the vehicle when the driver's intervention operation in the speed control is ended is equal to or larger than the second speed threshold and if the target inter-vehicle distance is selected as the correction candidate, the ECU determines whether an amount of change in the inter-vehicle distance in the first determination period is equal to or smaller than a first inter-vehicle distance threshold, determines whether a difference between the target inter-vehicle distance and the inter-vehicle distance when the driver's intervention operation in the speed control is ended is equal to or larger than a second inter-vehicle distance threshold, and corrects the target inter-vehicle distance to the inter-vehicle distance when the driver's intervention operation in the speed control is ended if it is determined that the amount of change in the inter-vehicle distance in the first determination period is equal to or smaller than the first inter-vehicle distance threshold and if it is determined that the difference between the inter-vehicle distance when the driver's intervention operation in the speed control is ended and the target inter-vehicle distance is equal to or larger than the second inter-vehicle distance threshold and if it is determined that the driver's intervention operation in the speed control is ended, the ECU causes the actuator to restart the speed control using the corrected target speed or the corrected target inter-vehicle distance corrected.

According to the aspects and the embodiments of the present invention, traveling control capable of realizing the driver's intention can be performed when interrupted traveling control is restarted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
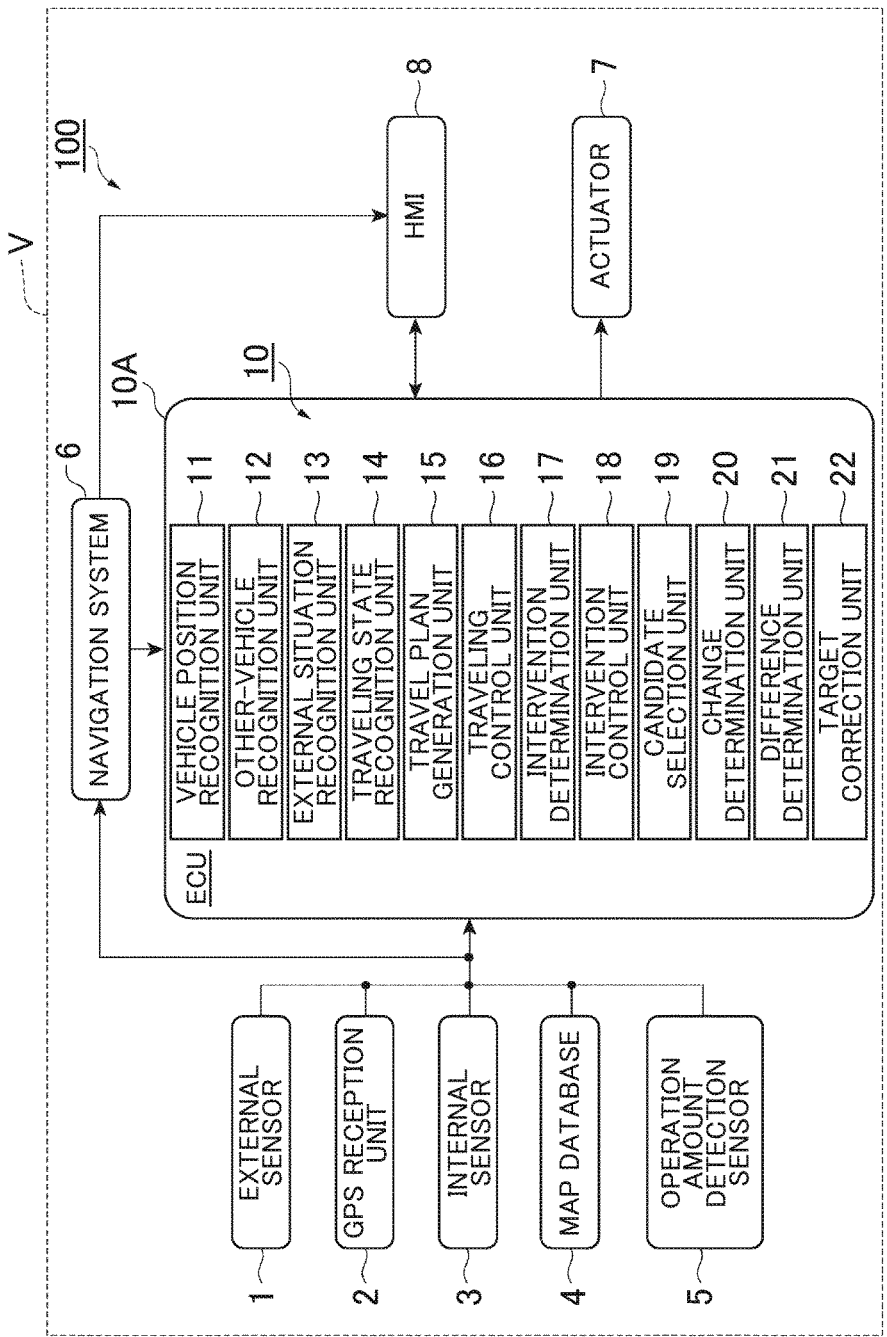
FIG. 1 is a block diagram showing the configuration of a vehicle that includes a vehicle traveling control device in this embodiment.

Embodiments of the present invention are described below with reference to the drawings. In the description below, the same reference numeral is used for the same or equivalent component and the duplicated description is omitted.

FIG. 1 is a block diagram showing the configuration of a vehicle V that includes a vehicle traveling control device 10 in this embodiment. As shown in FIG. 1, the vehicle V, such as a passenger car, has a vehicle system 100 included therein. The vehicle system 100, which includes the vehicle traveling control device 10, is a system that performs traveling control (steering control) for causing the vehicle V to autonomously travel in the center of the traveling lane and traveling control (speed control) for causing the vehicle V to autonomously follow the preceding vehicle. The configuration of the vehicle system 100 is described below.

The vehicle system 100 includes an external sensor 1, a Global Positioning System (GPS) reception unit 2, an internal sensor 3, a map database 4, an operation amount detection sensor 5, a navigation system 6, an actuator 7, a Human Machine Interface (HMI) 8, and an ECU 10A.

The external sensor 1 detects the external situation that is the surrounding information on the vehicle V. The external sensor 1 includes at least one of a camera, a radar, and a Laser Imaging Detection and Ranging (LIDAR).

The camera is a capturing apparatus that captures the external situation of the vehicle V. The camera is provided, for example, on the interior side of the windshield of the vehicle V. The camera may be a monocular camera or a stereo camera. The stereo camera includes two capturing units arranged so that the disparity between the right eye and the left eye can be reproduced. The information captured by the stereo camera also includes the depth direction information. The camera outputs the captured information on the external situation of the vehicle V to the ECU 10A.

The radar is a detection apparatus that detects an object outside the vehicle V using a radio wave. For example, the radio wave is a millimeter wave. The radar detects an object by sending a radio wave to the surroundings of the vehicle V and by receiving the radio wave reflected by an object. The radar can output the distance to, or the direction of, an object as the object information. The radar outputs the detected object information to the ECU 10A.

The LIDAR is a detection apparatus that detects an object outside the vehicle V using light. The LIDAR measures the distance to a reflection point and detects an object by sending light to the surroundings of the vehicle V and by receiving light reflected by the object. The LIDAR can output the distance to, or the direction of, an object as the object information. The LIDAR outputs the detected object information to the ECU 10A. When sensor fusion is performed in a subsequent stage, the reception information on the reflected light may be output to the ECU 10A. Two or more of the camera, LIDAR, and radar need not necessarily be installed.

The GPS reception unit 2 receives signals from three or more GPS satellites to acquire the position information indicating the position of the vehicle V. The position information includes the longitude and the latitude. The GPS reception unit 2 outputs the measured position information on the vehicle V to the ECU 10A. Instead of the GPS reception unit 2, another unit capable of identifying the longitude and latitude of the position of the vehicle V may be used.

The internal sensor 3 detects the information according to the traveling state of the vehicle V. The internal sensor 3 includes at least one of a speed sensor, an acceleration sensor, and a yaw rate sensor for detecting the information according to the traveling state of the vehicle V.

The speed sensor is a detection apparatus that detects the speed of the vehicle V. For example, a wheel speed sensor is used as the speed sensor. The wheel speed sensor is provided on the wheels of the vehicle V or on a component such as the drive shaft, which rotates in synchronization with the wheels, to detect the rotation speed of the wheels. The speed sensor outputs the speed information (wheel speed information), which includes the speed of the vehicle V, to the ECU 10A.

The acceleration sensor is a detection apparatus that detects the acceleration of the vehicle V. For example, the acceleration sensor includes a longitudinal acceleration sensor that detects acceleration in the longitudinal direction of the vehicle V and a lateral acceleration sensor that detects the lateral acceleration of the vehicle V. The acceleration sensor outputs the acceleration information, which includes the acceleration of vehicle V, to the ECU 10A.

The yaw rate sensor is a detection apparatus that detects the yaw rate (turning angle velocity) around the vertical axis at the center of gravity of the vehicle V. For example, a gyro sensor is used as the yaw rate sensor. The yaw rate sensor outputs the yaw rate information, which includes the yaw rate of the vehicle V, to the ECU 10A.

The map database 4 is a database that stores map information. For example, the map database 4 is formed in a hard disk drive (HDD) mounted on the vehicle V. The map information includes the position information on roads, the information on road shapes, and the position information on intersections and junctions. The information on a road shape includes the information on whether the road is a curved road or a straight road, the curvature of a curved road, and so on. In addition, when the vehicle system 100 uses the position information on shielding structures, such as a building or a wall, or the Simultaneous Localization and Mapping (SLAM) technology, the map information may include the output signal of the external sensor 1. The map database 4 may also be stored in a computer in facilities, such as an information processing center, that can communicate with the vehicle V.

The operation amount detection sensor 5 detects the operation amount of the acceleration/deceleration operation and the steering operation performed by the driver of the vehicle V. For example, the operation amount detection sensor 5 includes at least one of an accelerator pedal sensor, a brake pedal sensor, and a steering sensor.

The accelerator pedal sensor is a detection apparatus that detects the accelerator pedal depression amount (operation amount of acceleration/deceleration operation). The accelerator pedal depression amount is the accelerator pedal position (pedal position) in relation to the predetermined position. The predetermined position may be a fixed position or a position that is changed according to the predetermined parameter. The accelerator pedal sensor is provided, for example, on the shaft of the accelerator pedal of the vehicle V. The accelerator pedal sensor outputs the operation information, according to the accelerator pedal depression amount, to the ECU 10A.

The brake pedal sensor is a detection apparatus that detects the brake pedal depression amount (operation amount of the acceleration/deceleration operation). The brake pedal depression amount is the brake pedal position (pedal position) in relation to the predetermined position. The predetermined position may be a fixed position or a position that is changed according to the predetermined parameter. The brake pedal sensor is provided, for example, on a part of the brake pedal. The brake pedal sensor may detect the brake pedal operation force (the force on the brake pedal or the pressure of the master cylinder, etc.). The brake pedal sensor outputs the operation information, generated according to the brake pedal depression amount or the operation force, to the ECU 10A.

The steering sensor is a detection apparatus that detects the rotation state of steering. The detection value of the rotation state is the steering torque or steering angle (operation amount of the steering operation). The steering sensor is provided, for example, on the steering shaft of the vehicle V. The steering sensor outputs the information, which includes the steering torque or the steering angle of steering, to the ECU 10A.

The navigation system 6 is a device that guides the driver of the vehicle V to the destination that is set on the map by the driver of the vehicle V. The navigation system 6 calculates a route, along which the vehicle V will travel, based on the position information on the vehicle V measured by the GPS reception unit 2 and the map information stored in the map database 4. The route may be a route that identifies a traveling lane, in which the vehicle V will travel, in a multiple-lane area. The navigation system 6 calculates a desired route, from the position of the vehicle V to the destination, and informs the driver about the calculated desired route through display on the display device or through voice output from the speaker. The navigation system 6 outputs the information on the desired route of the vehicle V to the ECU 10A. The navigation system 6 may use the information stored in a computer in facilities, such as an information processing center, that can communicate with the vehicle V. A part of the processing to be performed by the navigation system 6 may also be performed by the computer in the facilities.

The actuator 7 is a device that performs the traveling control of the vehicle V. The actuator 7 includes at least a throttle actuator, a brake actuator, and a steering actuator. The throttle actuator controls the amount of air to be supplied to the engine (throttle angle) according to the control signal from the ECU 10A to control the driving force of the host vehicle V. When the vehicle V is a hybrid vehicle or an electric vehicle, the actuator 7 does not include a throttle actuator and, in this case, the control signal from the ECU 10A is input to the motor, which is the source of power, to control the driving force.

The brake actuator controls the brake system according to the control signal from the ECU 10A to control the braking force to be applied to the wheels of the vehicle V. As the brake system, a hydraulic brake system may be used. The steering actuator controls the driving of the assist motor, one component of the electric power steering system for controlling the steering torque, according to the control signal received from the ECU 10A. By doing so, the steering actuator controls the steering torque of the vehicle V.

The HMI 8 is an interface for outputting and inputting information between the occupants (including the driver) of the vehicle V and the vehicle system 100. The HMI 8 has a display panel for displaying image information to the occupants, a speaker for outputting voices, and operation buttons or a touch panel for allowing the occupants to perform input operations. The HMI 8 includes the autonomous driving ON/OFF switch that acts as an input unit via which an autonomous driving start request is entered. The autonomous driving ON/OFF switch may be configured to allow an occupant to enter an autonomous driving end request. When an occupant enters an autonomous driving start or end request, the autonomous driving IN/OFF switch outputs information, which indicates the autonomous driving start or end, to the ECU 10A. In addition, the HMI 8 may be configured to allow an occupant to enter the settings such as the target speed of the vehicle V and the target inter-vehicle distance at autonomous driving time. The HMI 8 is not limited to a switch but may be any unit that receives information via which the driver's intention can be determined. For example, the HMI 8 may be an autonomous driving start button or an autonomous driving end button or may a switch or a button displayed as an object on the screen on which the driver can perform an operation. The HMI 8 may output information to the occupants using a wirelessly connected mobile information terminal or may receive an input operation from the occupants using a mobile information terminal.

The ECU 10A controls the vehicle V. The ECU 10A is an electronic control unit that includes a Central Processing Unit (CPU), a Read Only Memory (ROM), a Random Access Memory (RAM), and a Controller Area Network (CAN) communication circuit. The ECU 10A, connected to a network that carries out communication using the CAN communication circuit, is connected to the above-described components of the vehicle V so that the ECU 10A can communicate with those components. For example, based on the signal output by the CPU, the ECU 10A causes the CAN communication circuit to operate to input and output data, to store the input data in the RAM, to load a program, stored in the ROM, into the RAM, and to execute the program loaded in the RAM. By doing so, the ECU 10A implements the functions of its components that will be described later. The ECU 10A may be configured by two or more electronic control units.

The ECU 10A includes a vehicle position recognition unit 11, an other-vehicle recognition unit 12, an external situation recognition unit 13, a traveling state recognition unit 14, a travel plan generation unit 15, a traveling control unit (vehicle control unit) 16, an intervention determination unit 17, an intervention control unit 18, a candidate selection unit 19, a change determination unit 20, a difference determination unit 21, and a target correction unit 22. The vehicle traveling control device 10 performs the traveling control of the vehicle V. In this embodiment, the vehicle traveling control device 10 includes the other-vehicle recognition unit 12, external situation recognition unit 13, traveling state recognition unit 14, travel control unit 16, intervention determination unit 17, intervention control unit 18, candidate selection unit 19, change determination unit 20, difference determination unit 21, and target correction unit 22.

The vehicle position recognition unit 11 recognizes the position of the vehicle V (hereinafter called "vehicle position") on the map based on the position information on the vehicle V received by the GPS reception unit 2 and the map information stored in the map database 4. The vehicle position recognition unit 11 may also recognize the vehicle position by acquiring the vehicle position, which will be used by the navigation system 6, from the navigation system 6. When the vehicle position is measured by a sensor installed outside the vehicle, (for example, installed on the road), the vehicle position recognition unit 11 may acquire the vehicle position from this sensor over communication.

The other-vehicle recognition unit 12 recognizes the presence of a preceding vehicle traveling ahead in the traveling lane of the vehicle V. For example, the other-vehicle recognition unit 12 recognizes the presence of a preceding vehicle based on the detection result of the external sensor 1. The detection result of the external sensor 1 includes the information captured by the camera, object information detected by the radar, or object information detected by the LIDAR. The other-vehicle recognition unit 12 may acquire the information on the presence of a preceding vehicle from the navigation system 6. The other-vehicle recognition unit 12 outputs the recognition result to the external situation recognition unit 13. When the traveling control unit 16 performs only the steering control, the vehicle traveling control device 10 need not include the other-vehicle recognition unit 12.

The external situation recognition unit 13 acquires the surrounding information on the vehicle V. The surrounding information is the information indicating the environment or the situation within a predetermined range from the vehicle V. For example, the external situation recognition unit 13 acquires the detection result of the external sensor 1 as the surrounding information on the vehicle V. The detection result of the external sensor 1 includes the information captured by the camera, object information detected by the radar, or object information detected by the LIDAR.

The external situation recognition unit 13 recognizes the external situation of the vehicle V based on the acquired information. The external situation of the vehicle V may include the junctions and merging points on the traveling road, traffic regulations, positions of lane lines indicating the boundaries of the traveling lane of the vehicle V or the position of the center of the lane, road width, and road shape. The road shape may be the curvature of the traveling lane, the road-surface slope changes efficiently used for the prospect estimation by the external sensor 1, or the road undulations.

In addition, when a preceding vehicle is recognized by the other-vehicle recognition unit 12, the external situation recognition unit 13 recognizes the speed difference (relative speed), and the inter-vehicle distance, between the vehicle V and the preceding vehicle. For example, the external situation recognition unit 13 recognizes the speed difference, and the inter-vehicle distance, between the vehicle V and the preceding vehicle based on the detection result of the external sensor 1. The external situation recognition unit 13 may recognize the situation of an obstacle around the vehicle V based on the detection result of the external sensor 1. The situation of an obstacle may include the information for distinguishing between non-moving objects and moving objects and the information on the moving direction or relative speed of an obstacle around the vehicle V.

The traveling state recognition unit 14 recognizes the traveling state of the vehicle V based on at least one of the detection result of the internal sensor 3, the recognition result of the vehicle position recognition unit 11, and the recognition result of the external situation recognition unit 13. The detection result of the internal sensor 3 includes the speed information detected by the speed sensor, the acceleration information detected by the acceleration sensor, and the yaw rate information detected by the yaw rate sensor. The traveling state is a value indicating the behavior of the vehicle V. The traveling state may include only one type of value (for example, speed) or two or more types of values (for example, speed and acceleration). The traveling state of the vehicle V includes the speed, acceleration, and yaw rate of the vehicle V. For example, the traveling state recognition unit 14 recognizes the speed of the vehicle V as the traveling state based on the detection result of the internal sensor 3. In addition, the traveling state recognition unit 14 may recognize the lateral position of the vehicle V within the traveling lane as the traveling state based on the vehicle position recognized by the vehicle position recognition unit 11.

The travel plan generation unit 15 generates a course of the vehicle V based on the desired route calculated by the navigation system 6, the vehicle position recognized by the vehicle position recognition unit 11, and the external situation (including the vehicle position and direction) of the vehicle V recognized by the external situation recognition unit 13. The course is a trajectory along which the vehicle V will travel on the desired route. The travel plan generation unit 15 generates a course so that the vehicle V travels smoothly on the desired route while satisfying the requirements for safety, regulation compliance, and traveling efficiency. In addition, the travel plan generation unit 15 generates a course of the vehicle V in such a manner that the vehicle V will avoid contact with an object based on the situation of the objects around the vehicle V.

The desired route described in this specification includes a traveling route generated automatically based on the external situation and the map information when the destination is not explicitly specified by the driver. An example of such a traveling route is a road-following route in the "driving assistance device" described in Japanese Patent No. 5382218 (WO2011/158347) or in the "autonomous driving device" described in Japanese Patent Application Publication No. 2011-162132 (JP 2011-162132 A).

The travel plan generation unit 15 generates a travel plan according to a generated course. That is, the travel plan generation unit 15 generates a travel plan along the desired route that is set on the map in advance, based at least on the external situation that is the surrounding information on the vehicle V and the map information stored in the map database 4. A travel plan includes a control target value that is used as the target when the vehicle system 100 performs vehicle control. For example, a travel plan may include the target speed and the target acceleration/deceleration of the vehicle V, or the target steering torque of steering, that will be applied when the vehicle V travels on a course along the desired route. A travel plan may include at least one of the speed pattern, acceleration/deceleration pattern, and the steering torque pattern of the vehicle V. The travel plan generation unit 15 may generate a travel plan so that the travel time (time required for the vehicle V to reach the destination) is minimized. The travel plan generation unit 15 generates a travel plan for approximately several seconds from the current time of day. To generate a travel plan, any known method that can describe the behavior of the vehicle V may be used.

The speed pattern refers to data composed of target speed values each of which is set associated with the time at each of the target control positions (including target lateral positions) that are set on the course at a predetermined interval (for example, 1 m). The acceleration/deceleration pattern refers to data composed of target acceleration/deceleration values each of which is set associated with the time at each of the target control positions that are set on the course at a predetermined interval (for example, 1 m). The steering torque pattern refers to data composed of target steering torque values each of which is set associated with the time at each of the target control positions that are set on the course at a predetermined interval (for example, 1 m).

The travel plan generation unit 15 generates a travel plan when the information indicating the start of autonomous driving is acquired from the autonomous driving ON/OFF switch. The travel plan generation unit 15 outputs a generated travel plan to the storage units that can be referenced by the traveling control unit 16.

The traveling control unit 16 performs traveling control using travel plans generated by the travel plan generation unit 15. The traveling control means that the vehicle V is caused to travel in the autonomous driving state. More specifically, the traveling control includes at least one of the speed control in the autonomous driving state and the steering control in the autonomous driving state. The traveling control unit 16 may perform either only one of the speed control and the steering control or a combination of them. The speed control in the autonomous driving state refers to the state in which the speed of the vehicle V or the inter-vehicle distance is adjusted only by the control of the vehicle system 100 without the driver performing the acceleration/deceleration operation. The steering control in the autonomous driving state refers to the state in which the lateral position of the vehicle V is adjusted only by the control of the vehicle system 100 without the driver performing the steering operation.

The raveling control by the traveling control unit 16 is not limited to the traveling control using travel plans. For example, the traveling control unit 16 may perform the automatic speed adjustment (speed control) in which a target speed and a target inter-vehicle distance are set as the target values. These target values may be fixed values determined according to the traveling environment or the law, values that are set by the driver, values that vary according to the time or the distance, or values that are set by the travel plan generation unit 15 according to the traveling situation. The automatic speed adjustment means the diving state in which the speed of the vehicle V is controlled automatically. For example, the automatic speed adjustment refers to the driving state in which the constant-speed control or the tracking control is performed as follows. When there is no preceding vehicle ahead of the vehicle V, the constant-speed control is performed for causing the vehicle V to travel at a constant speed according to the target speed that is set in advance. On the other hand, when there is a preceding vehicle ahead of the vehicle V, the tracking control is performed for adjusting the speed of the vehicle V according to the inter-vehicle distance to the preceding vehicle so that the target inter-vehicle distance that is set in advance is maintained. The automatic speed adjustment is implemented by the actuator 7 that operates based on the control signal output from the traveling control unit 16. The automatic speed adjustment automatically adjusts the speed of the vehicle V even when the driver does not perform the acceleration/deceleration operation (accelerator operation (for example, operation on the accelerator pedal) or the brake operation (for example, operation on the brake pedal)).

The traveling control unit 16 may also perform the automatic steering adjustment (steering control) in which a target lateral position is set as the target value. The target value may be a fixed value (for example, the center of the lane) determined according to the traveling environment, a value that is set by the driver, a value that varies according to the time or the distance, or a value that is set by the travel plan generation unit 15 according to the traveling situation. The automatic steering adjustment means the diving state in which the vehicle V is steered automatically so that the lateral position of the vehicle V becomes the target lateral position (or so that the vehicle V does not depart from the traveling lane). The automatic steering adjustment is implemented by the actuator 7 that operates based on the control signal output from the traveling control unit 16. The automatic steering adjustment automatically steers the vehicle V along the traveling lane even when the driver does not perform the steering operation.

The traveling control unit 16 acquires the recognition result of the external situation recognition unit 13 or the traveling state recognition unit 14 as the control result of the traveling control. The recognition result may include the traveling state of the vehicle V or the relation between the vehicle V and another vehicle (preceding vehicle). For example, when the traveling control is the speed control, the recognition result includes the speed of the vehicle V and the inter-vehicle distance between the vehicle V and the preceding vehicle. When the traveling control is the steering control, the recognition result includes the lateral position of the vehicle V. In this manner, the traveling control unit 16 acquires the recognition result corresponding to the target values that are set in advance. When performing the travel control of the vehicle V, the traveling control unit 16 uses the target values and the recognition result. For example, during the traveling control, the traveling control unit 16 performs feedback control using the target values and the recognition result.

An intervention, performed by the driver of the vehicle V, in the traveling control (autonomous driving state) is described below. When the driver performs an intervention operation to intervene in the traveling control during the traveling control performed by the traveling control unit 16, the traveling control unit 16 interrupts the traveling control and causes the vehicle V to travel with priority on the driver's intervention operation. The intervention operation refers to the driver's acceleration/deceleration operation during the speed control or to the driver's steering operation during the steering control. The interruption of the traveling control means that the control signal to the actuator 7, which is generated based on the processing of the traveling control processing, is not output. That is, the interruption of the traveling control simply means that the control signal is not output to the actuator 7. While the traveling control is interrupted, the travel plan generation processing in the background or the calculation processing of an offset between the target value and the recognition result may be continued or all the calculation processing related to the traveling control may be ended.

Traveling with priority on the driver's intervention operation refers to traveling in the cooperation driving state or in the manual driving state. The cooperation driving state refers to the driving state in which the traveling control and the intervention operation cooperate with each other to cause the vehicle V to travel based on the travel plan and the operation amount of the intervention operation. That is, the cooperation driving state is the state in which both the driver and the vehicle system 100 may participate in the traveling of the vehicle V and, while allowing the system to intervene, the vehicle V travels at least based on the operation amount of the driver's intervention operation. The manual driving state is the state in which the operation amount of the driver's intervention operation is reflected on the traveling of the vehicle V. That is, the manual driving state is the state in which, while preventing the system to intervene, the operation amount of the driver's intervention operation is reflected on the traveling of the vehicle V. The traveling control in this embodiment, which means the autonomous driving state, does not include the cooperation driving state and the manual driving state.

Figure 2A:
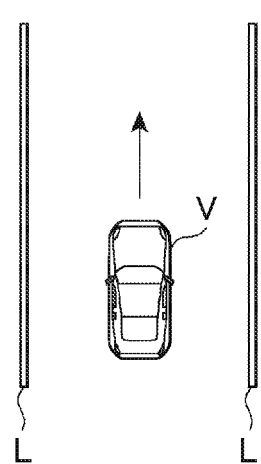
FIG. 2A is a diagram showing a driver's intervention in traveling control.

FIGS. 2A-2D are diagrams showing a driver's intervention in the traveling control. As shown in FIGS. 2A-2D, the vehicle V is traveling in the traveling lane, bounded by the lane boundaries L, under the traveling control. FIG. 2A shows a traveling scene in which both sides of the traveling lane ahead of the vehicle V face a wall or a precipice. In FIG. 2A, it is assumed that the traveling control unit 16 performs at least the speed control. That is, the vehicle V is traveling at a constant, target-speed that is the predetermined target value. In such a scene, the driver may depress the brake pedal during the traveling control to intervene in the traveling control so that the speed of the vehicle V that is traveling at the target speed is decreased. In some other case, the driver may depress the accelerator pedal during the traveling control to intervene in the traveling control so that the speed of the vehicle V that is traveling at the target speed is increased. In either case, when the driver performs the acceleration/deceleration operation, the traveling control unit 16 interrupts the speed control and causes the vehicle V to travel with priority on the driver's acceleration/deceleration operation (cooperation driving state or manual driving state).

Figure 2B:
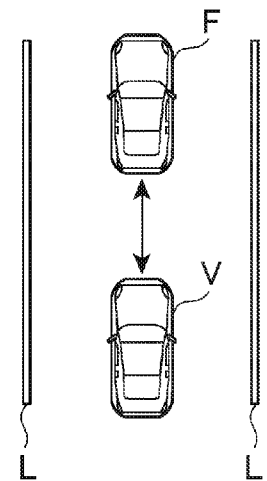
FIG. 2B is a diagram showing a driver's intervention in traveling control.

FIG. 2B shows a traveling scene in which there is a preceding vehicle ahead of the vehicle V. In FIG. 2B, it is assumed that the traveling control unit 16 performs at least the speed control. That is, the vehicle V is traveling while maintaining the target inter-vehicle distance that is the predetermined target value. In such a scene, the driver may depress the brake pedal during the traveling control to intervene in the traveling control so that the inter-vehicle distance of the vehicle V that is traveling with the target inter-vehicle distance is increased. In some other case, the driver may depress the accelerator pedal during the traveling control to intervene in the traveling control so that the inter-vehicle distance of the vehicle V that is traveling with the target inter-vehicle distance is decreased. In either case, when the driver performs the acceleration/deceleration operation, the traveling control unit 16 interrupts the speed control and causes the vehicle V to travel with priority on the driver's acceleration/deceleration operation (cooperation driving state or manual driving state).

Figure 2C:
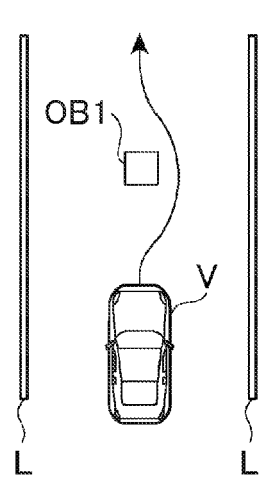
FIG. 2C is a diagram showing a driver's intervention in traveling control.

FIG. 2C shows a traveling scene in which there is an obstacle OB1 in the traveling lane ahead of the vehicle V. In FIG. 2C, it is assumed that the traveling control unit 16 performs at least the steering control. That is, the vehicle V is traveling while maintaining the target lateral position (center of the lane) that is the predetermined target value. In such a travelling scene, the driver may operate the steering wheel during the traveling control to intervene in the traveling control so that the vehicle V avoids the obstacle OB1. In this case, the traveling control unit 16 interrupts the steering control and causes the vehicle V to travel with priority on the driver's steering operation (cooperation driving state or manual driving state).

Figure 2D:
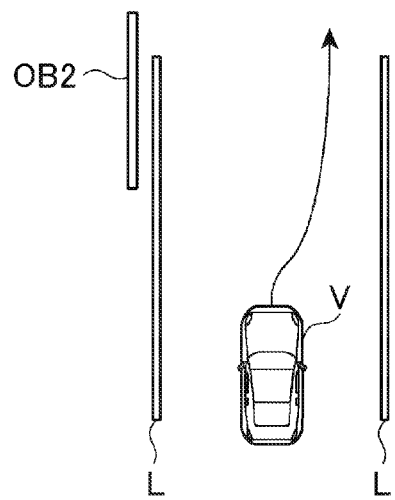
FIG. 2D is a diagram showing a driver's intervention in traveling control.

FIG. 2D shows a traveling scene in which there is a wall OB2 on the side of the traveling lane ahead of the vehicle V. In FIG. 2D, it is assumed that the traveling control unit 16 performs at least the steering control. That is, the vehicle V is traveling while maintaining the target lateral position (center of the lane) that is the predetermined target value. In such a traveling scene, the driver may operate the steering wheel during the traveling control to intervene in the traveling control so that the vehicle V avoids the wall OB2. In this case, the traveling control unit 16 interrupts the steering control and causes the vehicle V to travel with priority on the driver's steering operation (cooperation driving state or manual driving state).

The intervention processing described above is implemented by the intervention determination unit 17 and the intervention control unit 18 that are components of the vehicle traveling control device 10.

The intervention determination unit 17, connected to the operation amount detection sensor 5, acquires the operation amount of at least one of the intervention operations, performed by the driver of the vehicle V, in the traveling control. For example, the intervention determination unit 17 acquires the accelerator pedal depression amount, brake pedal depression amount, or steering torque or steering angle of the steering wheel as the operation amount of at least one of the intervention operations.

The intervention determination unit 17 determines the start of the intervention operation performed by the driver of the vehicle V during the travelling control. The intervention determination unit 17 determines whether the operation amount, detected by the operation amount detection sensor 5, is the operation amount related to the active travelling control. When the active travelling control is the speed control, the operation amount related to the active travelling control is the operation amount of the acceleration/deceleration operation. The operation amount of the acceleration/deceleration operation is, for example, the operation amount of the brake pedal or the accelerator pedal. When the active travelling control is the steering control, the operation amount related to the active travelling control is the operation amount of the steering operation. The operation amount of the steering operation is, for example, the operation amount of the steering wheel.

The intervention determination unit 17 determines that the intervention operation is started if the amount of operation related to the active travelling control is equal to or larger than a predetermined intervention start threshold. The predetermined intervention start threshold, which is a threshold for determining whether an intervention operation is performed, is set in advance. Setting this threshold avoids an erroneous determination that an unintended intervention operation is determined erroneously as an intervention operation, for example, when the driver mistakenly steers the steering wheel or mistakenly depresses the pedal. When the driver of the vehicle V enters an operation not corresponding to the travelling control, the intervention determination unit 17 does not determine that the operation is performed to start or end the intervention operation. That is, when the driver performs the steering operation during the speed control, the intervention determination unit 17 determines that the operation is not an intervention operation in the speed control. Similarly, when the driver performs the acceleration/deceleration operation during the steering control, the intervention determination unit 17 determines that the operation is not an intervention operation in the steering control. The intervention determination unit 17 outputs the signal, which indicates the start of the intervention operation, to the intervention control unit 18. As will be described later, the intervention determination unit 17 may use not only the operation amount condition but also a combination of the operation amount condition with another condition to determine whether an intervention operation is started by the driver of the vehicle V during the travelling control.

The intervention determination unit 17 determines the end of an intervention operation performed by the driver of the vehicle V during the travelling control. For example, when the operation amount acquired by the operation amount detection sensor 5 becomes equal to or smaller than the predetermined intervention end threshold for an intervention operation that is already started, the intervention determination unit 17 determines that the intervention operation is ended. The intervention determination unit 17 outputs the signal, which indicates the end of the intervention operation, to the intervention control unit 18. As will be described later, the intervention determination unit 17 may use not only the operation amount condition but also a combination of the operation amount condition with another condition to determine whether an intervention operation, performed by the driver of the vehicle V during the travelling control, is ended.

The intervention control unit 18 causes the traveling control unit 16 to interrupt the travelling control when the intervention determination unit 17 determines that a driver's intervention operation is started, and causes the traveling control unit 16 to restart the travelling control when the intervention determination unit 17 determines that a driver's intervention operation is ended. When the signal indicating the start of an intervention operation is acquired from the intervention determination unit 17, the intervention control unit 18 outputs the information, which indicates the interruption of the travelling control, to the traveling control unit 16. The intervention control unit 18 outputs the information to the traveling control unit 16 to interrupt the steering control when the driver intervenes in the steering operation, and to interrupt the speed control when the driver intervenes in the acceleration/deceleration operation. The traveling control unit 16 interrupts the travelling control based on the output of the intervention control unit 18. When the signal indicating the start of an intervention operation is received from the intervention determination unit 17, the intervention control unit 18 may cause the traveling control unit 16 to interrupt all active travelling controls.

In addition, the intervention control unit 18 outputs the information, which causes the traveling control unit 16 to restart the interrupted travelling control, when the intervention determination unit 17 determines that the driver's intervention operation is ended. The traveling control unit 16 restarts the interrupted travelling control in response to the information output by the intervention control unit 18. The intervention control unit 18 may delay the output of information, which causes the traveling control unit 16 to restart the interrupted travelling control, for a predetermined period until the driver's intention to restart the travelling control is obtained via the HMI 8.

The vehicle traveling control device 10 sets the target values of the travelling control to be restarted. This function is implemented by the candidate selection unit 19, change determination unit 20, and target correction unit 22.

First, the candidate selection unit 19 selects a correction candidate from the target values of the travelling control to be restarted. The correction candidate refers to a target value that is one of the target values of the travelling control to be restarted and is determined whether its value is to be changed. The candidate selection unit 19 selects a correction candidate based on the type of the intervention operation acquired by the intervention determination unit 17.

For example, if the intervention determination unit 17 determines the start and end of the steering operation as the intervention operation, the travelling control to be restarted is the steering control. Therefore, in this case, the candidate selection unit 19 selects the target lateral position as the correction candidate. The target lateral position may also be selected as the correction candidate when the intervention determination unit 17 determines the start of the steering operation as the intervention operation. Similarly, if the intervention determination unit 17 determines the start and end of the acceleration/deceleration operation as the intervention operation, the travelling control to be restarted is the speed control. Therefore, in this case, the candidate selection unit 19 selects the correction candidate from the target speed and the target inter-vehicle distance. More specifically, the candidate selection unit 19 selects the correction candidate from the target speed and the target inter-vehicle distance, based on the presence of a preceding vehicle and on the speed difference between the vehicle V and the preceding vehicle. For example, if there is no preceding vehicle or if the speed difference between the vehicle V and the preceding vehicle is not equal to or smaller than the predetermined speed, the candidate selection unit 19 determines that the target speed is the correction candidate. The predetermined speed is set in advance to determine whether there is a difference between the speed of the vehicle V (speed when the operation intervention is ended) and the speed of the preceding vehicle. That is, if it is determined that there is no preceding vehicle or if there is a difference between the speed of the vehicle V and the speed of the preceding vehicle, the candidate selection unit 19 determines that the target speed is the correction candidate. On the other hand, if there is a preceding vehicle and if the speed difference between the vehicle V and the preceding vehicle is equal to or smaller than the predetermined speed, the candidate selection unit 19 determines that the target inter-vehicle distance is the correction candidate. That is, if it is determined that there is no difference in speed between the vehicle V and the preceding vehicle, the candidate selection unit 19 determines that the target inter-vehicle distance is the correction candidate. If the acceleration/deceleration operation and the steering operation are performed as the intervention operation, the candidate selection unit 19 determines the correction candidate for each of the speed control and the steering control. When the traveling control unit 16 performs only the steering control, the vehicle system 100 need not include the candidate selection unit 19.

The change determination unit 20 determines whether there is a change in the recognition result, corresponding to the target value of the correction candidate, in the determination period (a first determination period or a second determination period) from a predetermined time before the end of the driver's intervention operation to the end of the driver's operation. The predetermined time is set in advance for determining whether there is a change in the recognition result corresponding to the target value of the correction candidate. This predetermined time indicates the length of the determination period. For example, a period of several seconds to several tens of seconds is set as the predetermined time. Whether there is a change in the recognition result is determined, for example, using the change amount of the recognition result per predetermined time and a change determination threshold. For example, when the intervention determination unit 17 determines that the end of the driver's intervention operation, the change determination unit 20 uses the recognition result, recognized the predetermined time before the end of the driver's intervention operation, and the recognition result, recognized at the end of the driver's intervention operation, to calculate the change amount of the recognition result per predetermined time (change amount of recognition result in the determination period). After that, the change determination unit 20 determines whether the change amount of the recognition result is equal to or smaller than the change determination threshold. The change determination threshold, which is a threshold for determining whether the recognition result corresponding to the target value of the correction candidate is stabilized, is set in advance for each correction candidate. That is, the change determination unit 20 determines whether the recognition result corresponding to the target value is stabilized when the intervention operation is ended.

For example, if the target speed is the correction candidate when the traveling control unit 16 restarts the speed control, the change determination unit 20 determines whether there is a change in the speed of the vehicle V in the first determination period. The first determination period is a period from the predetermined time before the end of the driver's intervention operation in the speed control to the end of the driver's intervention operation in the speed control. In a more specific example, the change determination unit 20 determines whether the amount of change in the speed of the vehicle V in the first determination period is equal to or smaller than the first speed threshold. The first speed threshold is an example of the change determination threshold. The first speed threshold, which is a threshold for determining whether there is a change in the speed of the vehicle V, is set in advance.

Similarly, if the target inter-vehicle distance is the correction candidate when the traveling control unit 16 restarts the speed control, the change determination unit 20 determines whether there is a change in the inter-vehicle distance between the vehicle V and the preceding vehicle in the first determination period. The first determination period is a period from the predetermined time before the end of the driver's intervention operation in the speed control to the end of the driver's intervention operation in the speed control. In a more specific example, the change determination unit 20 determines whether the amount of change in the inter-vehicle distance between the vehicle V and the preceding vehicle in the first determination period is equal to or smaller than the first inter-vehicle distance threshold. The first inter-vehicle distance threshold is an example of the change determination threshold. The first inter-vehicle distance threshold, which is a threshold for determining whether there is a change in the inter-vehicle distance between the vehicle V and the preceding vehicle, is set in advance.

When the traveling control unit 16 restarts the steering control (that is, the target lateral position is the correction candidate), the change determination unit 20 determines whether there is a change in the lateral position of the vehicle V in a second determination period. The second determination period is a period from the predetermined time before the end of the driver's intervention operation in the steering control to the end of the driver's intervention operation in the steering control. In a more specific example, the change determination unit 20 determines whether the amount of change in the lateral position of the vehicle V in the second determination period is equal to or smaller than the first lateral position threshold. The first lateral position threshold is an example of the change determination threshold. The first lateral position threshold, which is a threshold for determining whether there is a change in the lateral position of the vehicle V, is set in advance. The change determination unit 20 outputs the determination result to the target correction unit 22.

The difference determination unit 21 determines whether there is a difference between the target value and the recognition result recognized when the driver's intervention operation is ended. The difference between the target value and the recognition result is determined using a difference determination threshold. The difference determination threshold, which is a threshold for determining whether there is a difference between the target value and the recognition result, is set in advance for each correction candidate. For example, when the intervention determination unit 17 determines that the driver's intervention operation is ended, the difference determination unit 21 calculates the difference between the target value and the recognition result recognized when the driver's intervention operation is ended. After that, the difference determination unit 21 determines whether the difference is equal to or larger than the difference determination threshold. That is, when the intervention operation is ended, the difference determination unit 21 determines whether there is a difference between the target value and the recognition result.

For example, if the target speed is the correction candidate when the traveling control unit 16 restarts the speed control, the difference determination unit 21 determines whether the difference between the speed of the vehicle V when the driver's intervention operation is ended and the target speed is equal to or larger than a second speed threshold. The second speed threshold is an example of the difference determination threshold. The second speed threshold, which is a threshold for determining whether there is a difference between the speed of the vehicle V and the target speed, is set in advance.

Similarly, if the target inter-vehicle distance is the correction candidate when the traveling control unit 16 restarts the speed control, the difference determination unit 21 determines whether the difference between the inter-vehicle distance when the driver's intervention operation is ended and the target inter-vehicle distance is equal to or larger than a second inter-vehicle distance threshold. The second inter-vehicle distance threshold is an example of the difference determination threshold. The second inter-vehicle distance threshold, which is a threshold for determining whether there is a difference between the inter-vehicle distance and the target inter-vehicle distance, is set in advance.

Similarly, when the traveling control unit 16 restarts the steering control (that is, the target lateral position is the correction candidate), the difference determination unit 21 determines whether the difference between the lateral position when the driver's intervention operation is ended and the target lateral position is equal to or larger than a second lateral position threshold. The second lateral position threshold is an example of the difference determination threshold. The second lateral position threshold, which is a threshold for determining whether there is a difference between the lateral position and the target lateral position, is set in advance. The difference determination unit 21 outputs the determination result to the target correction unit 22.

The target correction unit 22 does not correct the target value of the correction candidate if the change determination unit 20 does not determine that the amount of change in the recognition result is equal to or smaller than the predetermined change determination threshold when the intervention operation is ended. More specifically, if the change determination unit 20 does not determine that the amount of change in the speed of the vehicle V is equal to or smaller than the first speed threshold, the target correction unit 22 does not correct the target speed of the correction candidate. Similarly, if the change determination unit 20 does not determine that the amount of change in the inter-vehicle distance is equal to or smaller than the first inter-vehicle distance threshold, the target correction unit 22 does not correct the target inter-vehicle distance of the correction candidate. Similarly, if the change determination unit 20 does not determine that the amount of change in the lateral position of the vehicle V is equal to or smaller than the first lateral position threshold, the target correction unit 22 does not correct the target lateral position of the correction candidate. A change in the recognition results, if any, indicates that the behavior of the vehicle V is not stable, meaning that the driver has performed the intervention operation, not for intentionally changing the target value, but for performing a temporary avoidance action. Therefore, the target correction unit 22 does not correct the target value of the correction candidate but uses the target value that has been used before the intervention.

The target correction unit 22 does not correct the target value of the correction candidate if the difference determination unit 21 does not determine that the difference between the recognition result when the intervention operation is ended and the target value of the correction candidate is equal to or larger than the difference determination threshold. More specifically, if the difference determination unit 21 does not determine that the difference between the speed of the vehicle V when the driver's acceleration/deceleration operation is ended and the target speed is equal to or larger than the second speed threshold, the target correction unit 22 does not correct the target value of the correction candidate. Similarly, if the difference determination unit 21 does not determine that the difference between the inter-vehicle distance when the driver's acceleration/deceleration operation is ended and the target inter-vehicle distance is equal to or larger than the second inter-vehicle distance threshold, the target correction unit 22 does not correct the target value of the correction candidate. Similarly, if the difference determination unit 21 does not determine that the difference between the lateral position of the vehicle V when the driver's steering operation is ended and the target lateral position is equal to or larger than the second lateral position threshold, the target correction unit 22 does not correct the target value of the correction candidate. This is because, if it is determined that the recognition result when the intervention operation is ended is equal to the target value of the correction candidate, there is no need to change the target value.

On the other hand, the target correction unit 22 corrects the target value to the recognition result recognized when the driver's intervention operation is ended if the change determination unit 20 determines that the amount of change in the recognition result is equal to or smaller than the change determination threshold and if the difference determination unit 21 determines that the difference is equal to or larger than the difference determination threshold. More specifically, if the change determination unit 20 determines that the amount of change in the speed of the vehicle V is equal to or smaller than the first speed threshold and if the difference determination unit 21 determines that the difference between the speed of the vehicle V when the driver's acceleration/deceleration operation is ended and the target speed is equal to or larger than the second speed threshold, the target correction unit 22 corrects the target speed to the speed of the vehicle V recognized when the driver's acceleration/deceleration operation is ended. Similarly, if the change determination unit 20 determines that the amount of change in the inter-vehicle distance is equal to or smaller than the first inter-vehicle distance threshold and if the difference determination unit 21 determines that the difference between the inter-vehicle distance when the driver's acceleration/deceleration operation is ended and the target inter-vehicle distance is equal to or larger than the second inter-vehicle distance threshold, the target correction unit 22 corrects the target inter-vehicle distance to the inter-vehicle distance recognized when the driver's acceleration/deceleration operation is ended. Similarly, if the change determination unit 20 determines that the amount of change in the lateral position of the vehicle V is equal to or smaller than the first lateral position threshold and if the difference determination unit 21 determines that the difference between the lateral position of the vehicle V when the driver's steering operation is ended and the target lateral position is equal to or larger than the second lateral position threshold, the target correction unit 22 corrects the target lateral position to the lateral position of the vehicle V recognized when the driver's steering operation is ended. If the vehicle behavior is stable and if there is a difference between the recognition result when the intervention operation is ended and the target value of the correction candidate, it can be estimated that the driver intends to change the target value. Therefore, the target correction unit 22 corrects the target value of the correction candidate to the recognition result recognized when the intervention operation is ended.

The target correction unit 22 corrects the target value stored in the storage unit such as the RAM provided in the ECU 10A. The traveling control unit 16 references the storage unit when performing the travelling control. This allows the traveling control unit 16 to restart the travelling control, using the target values corrected by the target correction unit 22, after the intervention operation is ended.

Figure 3:
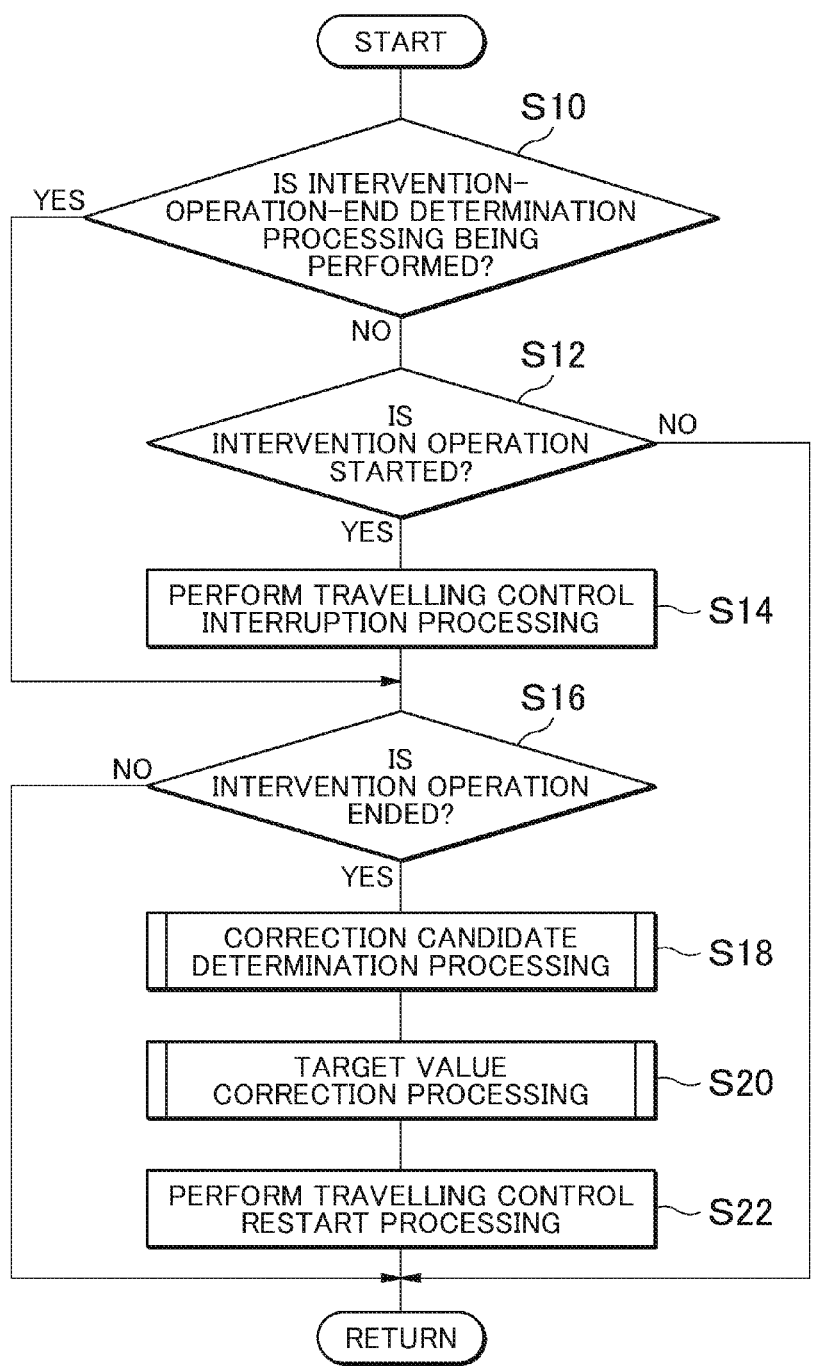
FIG. 3 is a flowchart showing the processing from the interruption to the restart of traveling control.

Next, the processing performed by the vehicle traveling control device 10 is described. FIG. 3 is a flowchart showing the processing from the interruption to the restart of the traveling control. The flowchart shown in FIG. 3 is started by the ECU 10A when the travelling control (at least one of the speed control and the steering control) of the vehicle V is started. When the processing of the flowchart reaches RETURN, the ECU 10A starts the processing again from START. If the driver intentionally ends the travelling control via the switch operation, the ECU 10A ends the processing of the flowchart even if the processing is not yet completed, and performs the processing corresponding to the predetermined forced end.

As shown in FIG. 3, the intervention determination unit 17 of the vehicle traveling control device 10 determines whether the intervention-end determination processing (S16) described below is being performed (S10). That is, in the processing in S10, it is determined whether the intervention operation is already started. For example, the intervention determination unit 17 references the determination flag to determine whether the intervention-end determination processing (S16) described below is being performed. The determination flag is a flag that is set in the intervention-end determination processing (S16). For example, the determination flag, when 0, indicates that the determination processing is not being performed and, when 1, indicates that the determination processing is being performed. The initial value of the determination flag is 0. If it is determined that the intervention-operation-end determination processing is not being performed, the processing proceeds to the intervention start determination processing (S12).

The intervention determination unit 17 performs the intervention-start determination processing (S12) to determine whether a driver's intervention operation is started. If the operation amount detected by the operation amount detection sensor 5 is the operation amount related to the active travelling control and is equal to or larger than the predetermined intervention start threshold, the intervention determination unit 17 determines that the driver's intervention operation is started. The intervention determination unit 17 outputs the signal, which indicates the start of the intervention operation, to the intervention control unit 18. When the driver's intervention operation is started, the processing proceeds to the travelling control interruption processing (S14).

The intervention control unit 18 of the vehicle traveling control device 10 performs the travelling control interruption processing (S14) to cause the traveling control unit 16 to interrupt the active travelling control. For example, the intervention control unit 18 outputs the information, which indicates the interruption, to the traveling control unit 16. Based on the information output by the intervention control unit 18, the traveling control unit 16 interrupts the travelling control. After that, the processing proceeds to the intervention-end determination processing (S16).

The intervention determination unit 17 of the vehicle traveling control device 10 performs the intervention-end determination processing (S16) to determine whether the driver's intervention operation is ended. If the operation amount detected by the operation amount detection sensor 5 becomes equal to or smaller than the predetermined intervention end threshold, the intervention determination unit 17 determines that the intervention operation is ended. At this time, the intervention determination unit 17 sets the determination flag to 0. On the other hand, if it is not determined that the intervention operation is ended, the intervention determination unit 17 sets the determination flag to 1 and ends the flowchart shown in FIG. 3. When the processing reaches RETURN, the processing is started at START. If the determination flag is 1 in the processing in S10, the processing proceeds again to the intervention-end determination processing (S16). In this way, the intervention-end determination processing (S16) is performed repeatedly until the determination flag is set to 0, that is, until it is determined that the driver's intervention operation is ended. If a predetermined period of time elapses after the start of the repeated executions of the intervention-end determination processing (S16), the intervention determination unit 17 may set the determination flag to 0 and end the flowchart shown in FIG. 3. If it is determined that the driver's intervention operation is ended, the processing proceeds to the correction candidate determination processing (S18).

Figure 4:
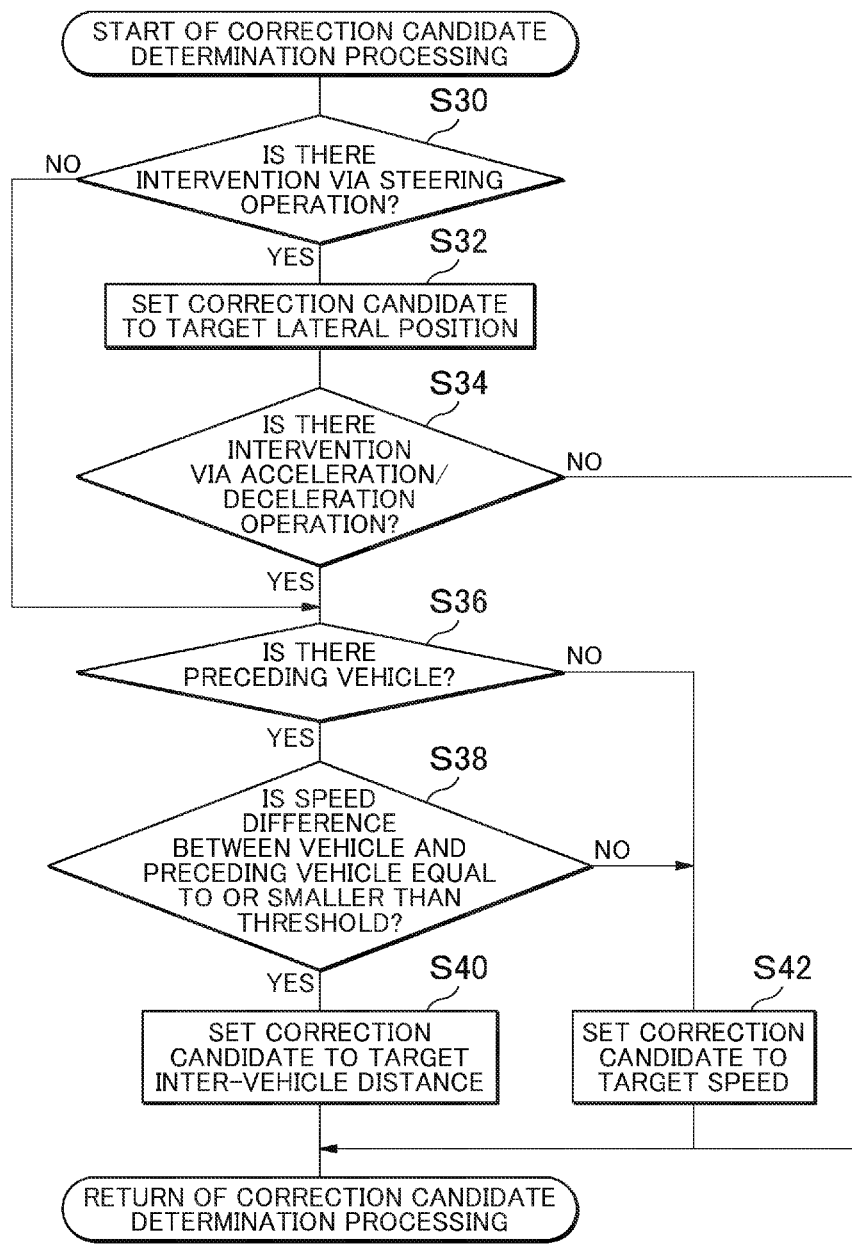
FIG. 4 is a flowchart showing the correction candidate determination processing.

The candidate selection unit 19 of the vehicle traveling control device 10 performs the correction candidate determination processing (S18) to select a correction candidate from the target values of the travelling control to be restarted. In the description below, it is assumed that the speed control and the steering control are performed as the travelling control. FIG. 4 is a flowchart showing the correction candidate determination processing. As shown in FIG. 4, the candidate selection unit 19 performs the steering operation determination processing (S30) to determine whether there is an intervention via the steering operation. The candidate selection unit 19 receives the determination result of the intervention determination unit 17 to determine the type of the intervention operation. If it is determined that there is an intervention via the steering operation, the candidate selection unit 19 performs the candidate setting processing (S32) to set the correction candidate to the target lateral position. When the candidate setting processing (S32) is ended, the processing proceeds to the acceleration/deceleration operation determination processing (S34).

The candidate selection unit 19 performs the acceleration/deceleration operation determination processing (S34) to determine whether there is an intervention operation via the acceleration/deceleration operation. The candidate selection unit 19 receives the determination result of the intervention determination unit 17 to determine the type of the intervention operation. If the candidate selection unit 19 determines that there is an intervention via the acceleration/deceleration operation, the processing proceeds to the preceding vehicle determination processing (S36). In addition, if it is determined by the steering operation determination processing in S30 that the intervention is not an intervention via the steering operation, it is determined that the intervention is an intervention via the acceleration/deceleration operation. In this case, too, the processing proceeds to the preceding vehicle determination processing (S36) as in the case in which it is determined in the acceleration/deceleration operation determination processing in S34 that there is an intervention via the acceleration/deceleration operation (S36).

The candidate selection unit 19 performs the preceding vehicle determination processing (S36) to determine whether there is a preceding vehicle, based on the surrounding information recognized by the external situation recognition unit 13. If it is determined that there is a preceding vehicle, the processing proceeds to the speed difference determination processing (S38).

The candidate selection unit 19 performs the speed difference determination processing (S38) to determine whether the speed difference between the vehicle V and the preceding vehicle is equal to or smaller than the predetermined speed. If it is determined that the speed difference is equal to or smaller than the predetermined speed, the candidate selection unit 19 performs the candidate setting processing (S40) to set the correction candidate to the target inter-vehicle distance. If the target lateral position is set as the correction candidate in the candidate setting processing in S32, the correction candidate is the target lateral position and the target inter-vehicle distance. After the candidate setting processing in S40 is ended, the flowchart shown in FIG. 4 is ended.

On the other hand, if it is determined in the preceding vehicle determination processing in S36 that there is no preceding vehicle or if it is determined in the speed difference determination processing in S38 that the speed difference is not equal to or smaller than the predetermined speed, the candidate selection unit 19 performs the candidate setting processing (S42) to set the correction candidate to the target speed. If the target lateral position is set as the correction candidate in the candidate setting processing in S32, the correction candidate is the target lateral position and the target speed. After the candidate setting processing in S42 is ended, the flowchart shown in FIG. 4 is ended. If the candidate selection unit 19 determines in the acceleration/deceleration operation determination processing (S34) that there is no intervention via the acceleration/deceleration operation, the flowchart shown in FIG. 4 is ended.

Figure 5:
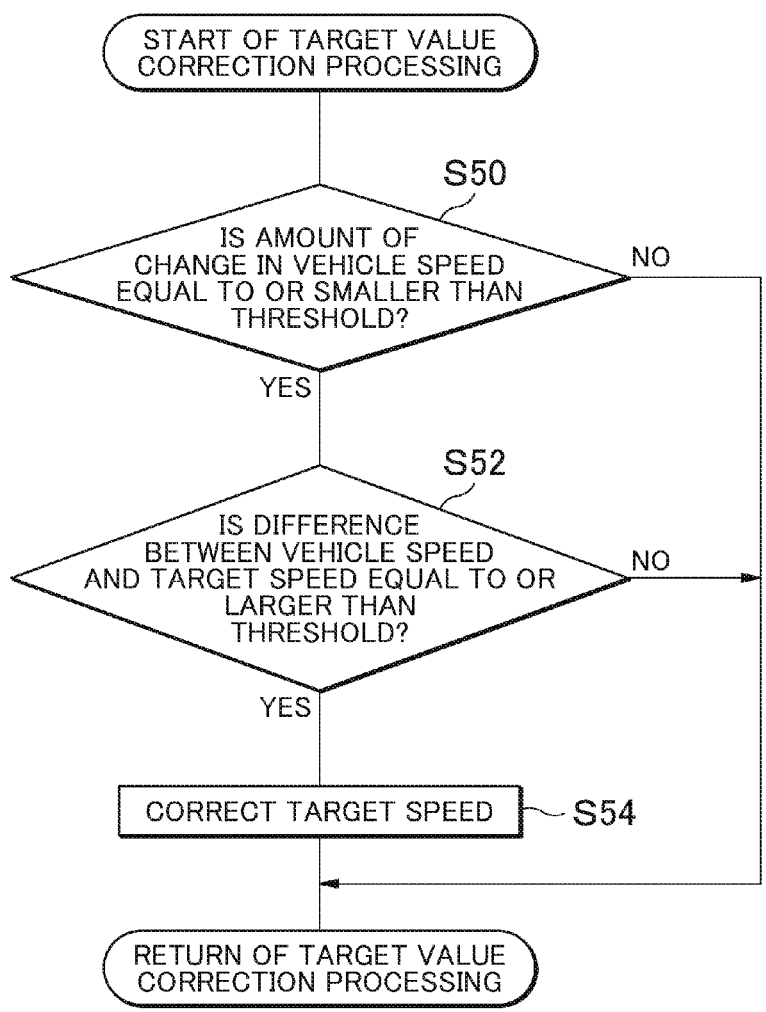
FIG. 5 is a flowchart showing the target value correction processing when the target speed is a correction candidate.
Figure 6:
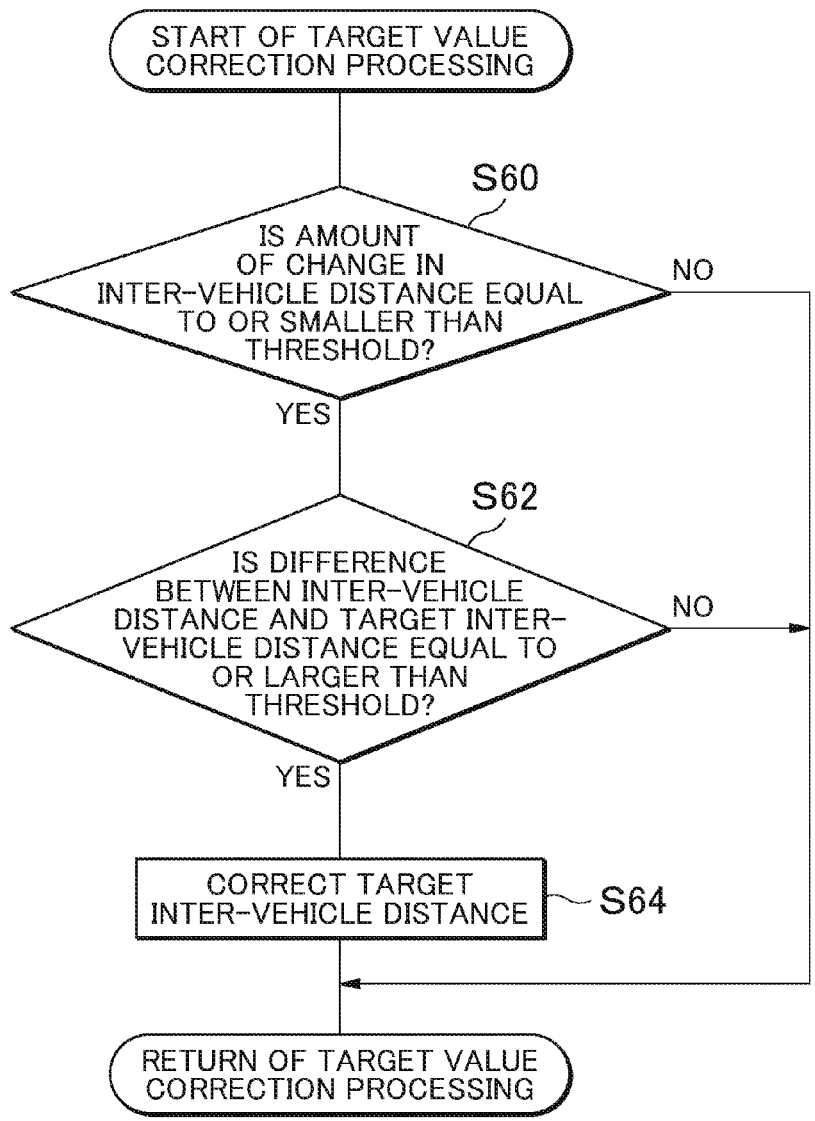
FIG. 6 is a flowchart showing the target value correction processing when the target inter-vehicle distance is a correction candidate.
Figure 7:
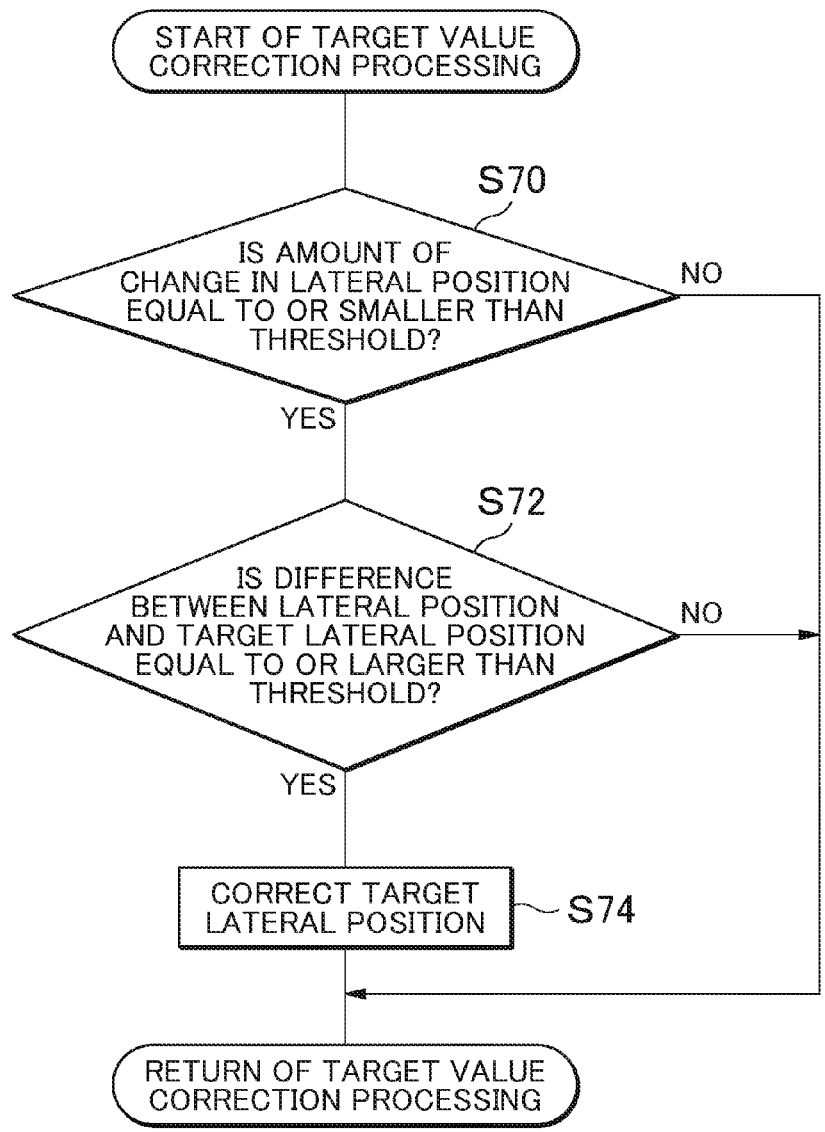
FIG. 7 is a flowchart showing the target value correction processing when the target lateral position is a correction candidate.

After the flowchart shown in FIG. 4 is ended, the processing returns to FIG. 3 and the target value correction processing (S20) is performed. FIG. 5 to FIG. 7 are flowcharts showing the target value correction processing. FIG. 5 is a flowchart showing the target value correction processing when the target speed is the correction candidate. FIG. 6 is a flowchart showing the target value correction processing when the target inter-vehicle distance is the correction candidate. FIG. 7 is a flowchart showing the target value correction processing when the target lateral position is the correction candidate. Based on the target value of the correction candidate, the change determination unit 20 selects a flowchart, which will be performed, from the flowcharts shown in FIG. 5 to FIG. 7. When the correction candidate is the target speed, the flowchart in FIG. 5 is performed. When the correction candidate is the target inter-vehicle distance, the flowchart in FIG. 6 is performed. When the correction candidate is the target lateral position, the flowchart in FIG. 7 is performed. The flowcharts shown in FIGS. 5-7 can be performed independently (in parallel). Therefore, when the correction candidate is the target speed and the target lateral position, each of the flowcharts in FIG. 5 and FIG. 7 is performed.

First, the processing performed when the correction candidate is the target speed is described. As shown in FIG. 5, the change determination unit 20 performs the change determination processing (S50) to determine whether the amount of change in the speed of the vehicle V in the first determination period, from the predetermined time before the end of the driver's intervention operation to the end of the driver's intervention operation, is equal to or smaller than the first speed threshold. If it is determined that the amount of change in the speed of the vehicle V in the first determination period is equal to smaller than the first speed threshold, the processing proceeds to the difference determination processing (S52).

The difference determination unit 21 performs the difference determination processing (S52) to determine whether the difference between the target speed and the speed of the vehicle V when the driver's intervention operation is ended is equal to or larger than the second speed threshold. If it is determined that the difference is equal to or larger than the second speed threshold, the target correction unit 22 performs the target value correction processing (S54) to correct the target value of the correction candidate. The target correction unit 22 corrects the target speed, which is the correction candidate, to the speed of the vehicle V recognized when the intervention operation is ended. After the correction processing in S54 is ended, the flowchart shown in FIG. 5 is ended.

On the other hand, if it is determined in the change determination processing in S50 that the amount of change in the speed of the vehicle V in the first determination period is not equal to or smaller than the first speed threshold or if it is determined in the difference determination processing in S52 that the difference is not equal to or larger than the second speed threshold, the target correction unit 22 does not correct the target speed that is the correction candidate. In this case, the flowchart shown in FIG. 5 is ended.

Next, the processing performed when the correction candidate is the target inter-vehicle distance is described. As shown in FIG. 6, the change determination unit 20 performs the change determination processing (S60) to determine whether the amount of change in the inter-vehicle distance in the first determination period, from the predetermined time before the end of the driver's intervention operation to the end of the driver's intervention operation, is equal to or smaller than the first inter-vehicle distance threshold. If it is determined that the amount of change in the inter-vehicle distance in the first determination period is equal to smaller than the first inter-vehicle distance threshold, the processing proceeds to the difference determination processing (S62).

The difference determination unit 21 performs the difference determination processing (S62) to determine whether the difference between the target inter-vehicle distance and the inter-vehicle distance when the driver's intervention operation is ended is equal to or larger than the second inter-vehicle distance threshold. If it is determined that the difference is equal to or larger than the second inter-vehicle distance threshold, the target correction unit 22 performs the target value correction processing (S64) to correct the target value of the correction candidate. The target correction unit 22 corrects the target inter-vehicle distance, which is the correction candidate, to the inter-vehicle distance recognized when the intervention operation is ended. After the correction processing in S64 is ended, the flowchart shown in FIG. 6 is ended.

On the other hand, if it is determined in the change determination processing in S60 that the amount of change in the inter-vehicle distance in the first determination period is not equal to or smaller than the first inter-vehicle distance threshold or if it is determined in the difference determination processing in S62 that the difference is not equal to or larger than the second inter-vehicle distance threshold, the target correction unit 22 does not correct the target inter-vehicle distance that is the correction candidate. In this case, the flowchart shown in FIG. 6 is ended.

Next, the processing performed when the correction candidate is the target lateral position is described. As shown in FIG. 7, the change determination unit 20 performs the change determination processing (S70) to determine whether the amount of change in the lateral position in the second determination period, from the predetermined time before the end of the driver's intervention operation to the end of the driver's intervention operation, is equal to or smaller than the first lateral position threshold. If it is determined that the amount of change in the lateral position in the second determination period is equal to smaller than the first lateral position threshold, the processing proceeds to the difference determination processing (S72).

The difference determination unit 21 performs the difference determination processing (S72) to determine whether the difference between the target lateral position and the lateral position of the vehicle V when the driver's intervention operation is ended is equal to or larger than the second lateral position threshold. If it is determined that the difference is equal to or larger than the second lateral position threshold, the target correction unit 22 performs the target value correction processing (S74) to correct the target value of the correction candidate. The target correction unit 22 corrects the target lateral position, which is the correction candidate, to the lateral position of the vehicle V recognized when the intervention operation is ended. After the correction processing in S74 is ended, the flowchart shown in FIG. 7 is ended.

On the other hand, if it is determined in the change determination processing in S70 that the amount of change in the lateral position of the vehicle V in the second determination period is not equal to or smaller than the first lateral position threshold or if it is determined in the difference determination processing in S72 that the difference is not equal to or larger than the second lateral position threshold, the target correction unit 22 does not correct the target lateral position that is the correction candidate. In this case, the flowchart shown in FIG. 7 is ended.

When the processing of the flowcharts shown in FIG. 5 to FIG. 7 is ended, the processing returns to FIG. 3 and the travelling control restart processing (S22) is performed. The intervention control unit 18 performs the travelling control restart processing (S22) to cause the traveling control unit 16 to restart the interrupted travelling control. For example, the intervention control unit 18 outputs the information, which indicates the restart, to the traveling control unit 16. Based on the information output from the intervention control unit 18, the traveling control unit 16 restarts the travelling control. When the travelling control restart processing in S22 is ended, the flowchart shown in FIG. 3 is ended. If it is determined in the intervention-start determination processing in S12 that the driver's intervention operation is not started, the flowchart shown in FIG. 3 is ended because there is no need to interrupt the travelling control.

The processing performed by the vehicle traveling control device 10 has been described. Next, a specific example of the vehicle traveling control device 10 is described.

Figure 8A:
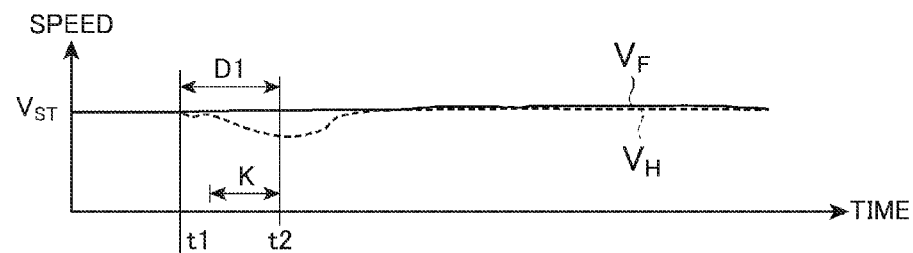
FIG. 8A is a graph showing a change over time in the vehicle speed.

First, an example of the intervention operation in the speed control is described. FIGS. 8A-8D are graphs showing a change over time in the speed of the vehicle V (FIGS. 8A-8C) and in the inter-vehicle distance (FIG. 8D). FIGS. 8A-8D show the recognition results (sensor values of the speed and the inter-vehicle distance) when the target value is the target speed and the target inter-vehicle distance and when there is an intervention via the acceleration/deceleration operation. FIG. 8A, which corresponds to the traveling scene shown in FIG. 2B, shows the case in which there is a preceding vehicle and the driver adjusts the speed. FIG. 8A is a graph showing a change over time in the speed of the vehicle V, with the speed of the vehicle V on the vertical axis and the time on the horizontal axis. The solid line indicates the speed $V_F$ of the preceding vehicle, and the broken line indicates the speed $V_H$ of the vehicle V. The target speed is indicated by $V_{BT}$. In this figure, it is assumed that the driver depresses the brake pedal at time t1 and that this brake pedal operation is determined to be an intervention in the speed control. In this case, at least the speed control is interrupted at time t1. After that, it is assumed that the intervention is determined ended at time t2. After the intervention is ended, the correction candidate determination processing is started. In this example, it is assumed that the difference between the speed $V_H$ and the target speed $V_{BT}$ at time t2 is equal to or larger than the predetermined speed. In this case, the correction candidate is the target speed. If the driver adjusts the speed temporarily, the amount of change in the speed $V_H$ of the vehicle V per unit time in the first determination period K becomes large (not equal to or smaller than the first speed threshold) as shown in FIG. 8A. Therefore, the vehicle traveling control device 10 determines that the traveling state of the vehicle V is not stable and, as a result, does not change the target speed $V_{BT}$. After the intervention period D1 is ended, the vehicle traveling control device 10 restarts the speed control, with the target speed $V_{BT}$ unchanged from that before the intervention. After the speed control is restarted, the speed $V_H$ of the vehicle V gradually approaches the target speed $V_{BT}$. In this manner, in a traveling scene in which the driver adjusts the speed temporarily, the vehicle traveling control device 10 restarts the speed control with the target speed $V_{BT}$ unchanged from that before the intervention, thus allowing the travelling control to be restarted according to the driver's intention.

Figure 8B:
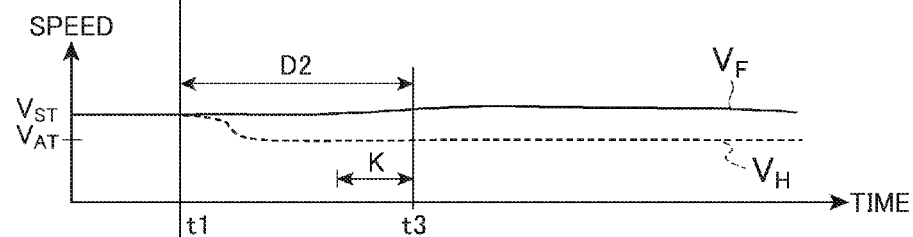
FIG. 8B is a graph showing a change over time in the vehicle speed.

FIG. 8B, which corresponds to the traveling scene shown in FIG. 2B, shows the case in which there is a preceding vehicle and the driver adjusts the speed. FIG. 8B is a graph showing a change over time in the speed of the vehicle V, with the speed of the vehicle V on the vertical axis and the time on the horizontal axis. The solid line indicates the speed $V_F$ of the preceding vehicle, and the broken line indicates the speed $V_H$ of the vehicle V. The target speed is indicated by $V_{BT}$. In this figure, it is assumed that the driver depresses the brake pedal at time t1 and that this brake pedal operation is determined to be an intervention in the speed control. In this case, at least the speed control is interrupted at time t1. After that, it is assumed that the intervention is determined ended at time t3. After the intervention is ended, the correction candidate determination processing is started. In this example, it is assumed that the difference between the speed $V_H$ and the target speed $V_{BT}$ at time t3 is equal to or larger than the predetermined speed. In this case, the correction candidate is the target speed. In FIG. 8B, the driver adjusts the speed for a longer time than in FIG. 8A. In this case, the amount of change in the speed $V_H$ of the vehicle V per unit time in the first determination period K becomes small (equal to or smaller than the first speed threshold). Therefore, the vehicle traveling control device 10 determines that the traveling state of the vehicle V is stable. In addition, the difference between the stable speed $V_H$ of the vehicle V and the target speed $V_{BT}$ is large (equal to or larger than the second speed threshold). Therefore, the vehicle traveling control device 10 corrects the target speed $V_{BT}$ to the speed $V_H(V_{AT})$ that is the speed of the vehicle V at time t3. After the intervention period D2 is ended, the vehicle traveling control device 10 restarts the speed control at the corrected target speed $V_{AT}$. After the target speed is corrected, the speed $V_H$ of the vehicle V is maintained at the corrected target speed $V_{AT}$. In this manner, in a traveling scene in which the driver adjusts the speed at a fixed speed for a long time, the vehicle traveling control device 10 restarts the speed control at the corrected target speed $V_{AT}$, thus allowing the travelling control to be restarted according to the driver's intention.

Figure 8C:
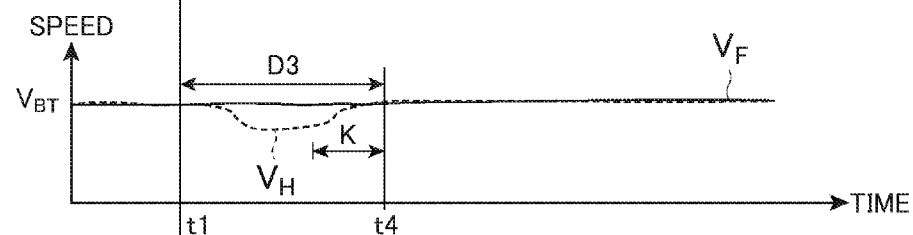
FIG. 8C is a graph showing a change over time in the vehicle speed.
Figure 8D:
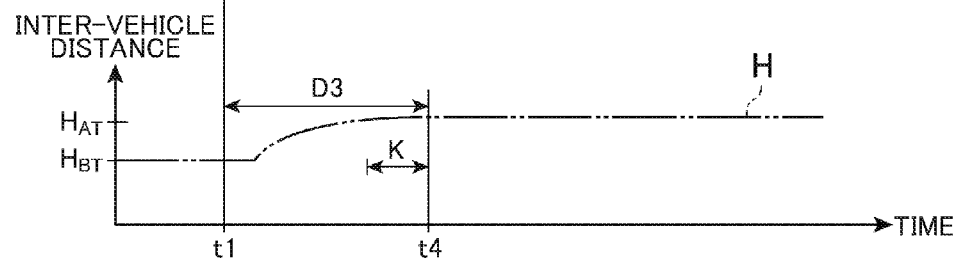
FIG. 8D is a graph showing a change over time in the inter-vehicle distance.

FIGS. 8C-8D, which correspond to the traveling scene shown in FIG. 2B, show the case in which there is a preceding vehicle and the driver adjusts the inter-vehicle distance. FIG. 8C is a graph showing a change over time in the speed of the vehicle V, with the speed of the vehicle V on the vertical axis and the time on the horizontal axis. The solid line indicates the speed $V_F$ of the preceding vehicle, and the broken line indicates the speed $V_H$ of the vehicle V. The target speed is indicated by $V_{BT}$. FIG. 8D is a graph showing a change over time in the inter-vehicle distance H, with the inter-vehicle distance between the vehicle V and the preceding vehicle on the vertical axis and the time on the horizontal axis. The target inter-vehicle distance is indicated by $H_{BT}$. In those figures, it is assumed that the driver depresses the brake pedal at time t1 and that this brake pedal operation is determined to be an intervention. In this case, the speed control is interrupted at time t1. After that, it is assumed that the intervention is determined ended at time t4. After the intervention is ended, the correction candidate determination processing is started. As shown in FIGS. 8C-8D, the driver adjusts the speed $V_H$ of the vehicle V to increase the inter-vehicle distance H and, after that, returns the speed $V_H$ to the original speed. It is assumed that the difference between the speed $V_H$ and the target speed $V_{BT}$ at time t4 is not equal to or larger than the second speed threshold. In this case, the correction candidate is the inter-vehicle distance. Because the target speed is not the correction candidate, the vehicle traveling control device 10 does not change the target speed $V_{BT}$. On the other hand, it is assumed that the amount of change in the inter-vehicle distance H per unit time is small in the first determination period K (equal to or smaller than the first inter-vehicle distance threshold). In this case, the vehicle traveling control device 10 determines that the traveling state of the vehicle V is stable. In addition, it is assumed that the difference between the stable inter-vehicle distance H and the target inter-vehicle distance $H_{BT}$ is large (equal to or larger than the second inter-vehicle distance). In this case, the vehicle traveling control device 10 corrects the target inter-vehicle distance $H_{BT}$ to the inter-vehicle distance H ($H_{AT}$) at time t4. After the intervention period D3 is ended, the vehicle traveling control device 10 restarts the speed control at the target speed, which is the target speed before the intervention, and at the corrected target inter-vehicle distance $H_{AT}$. Thus, the inter-vehicle distance H is maintained at the corrected target inter-vehicle distance $H_{AT}$. In this manner, the vehicle traveling control device 10 predicts from the recognition result (sensor values of the speed and the inter-vehicle distance) that the driver intends to change only the target value of the inter-vehicle distance H and restarts the speed control at the corrected inter-vehicle distance $H_{AT}$, thus allowing the travelling control to be restarted according to the driver's intention.

Figure 9:
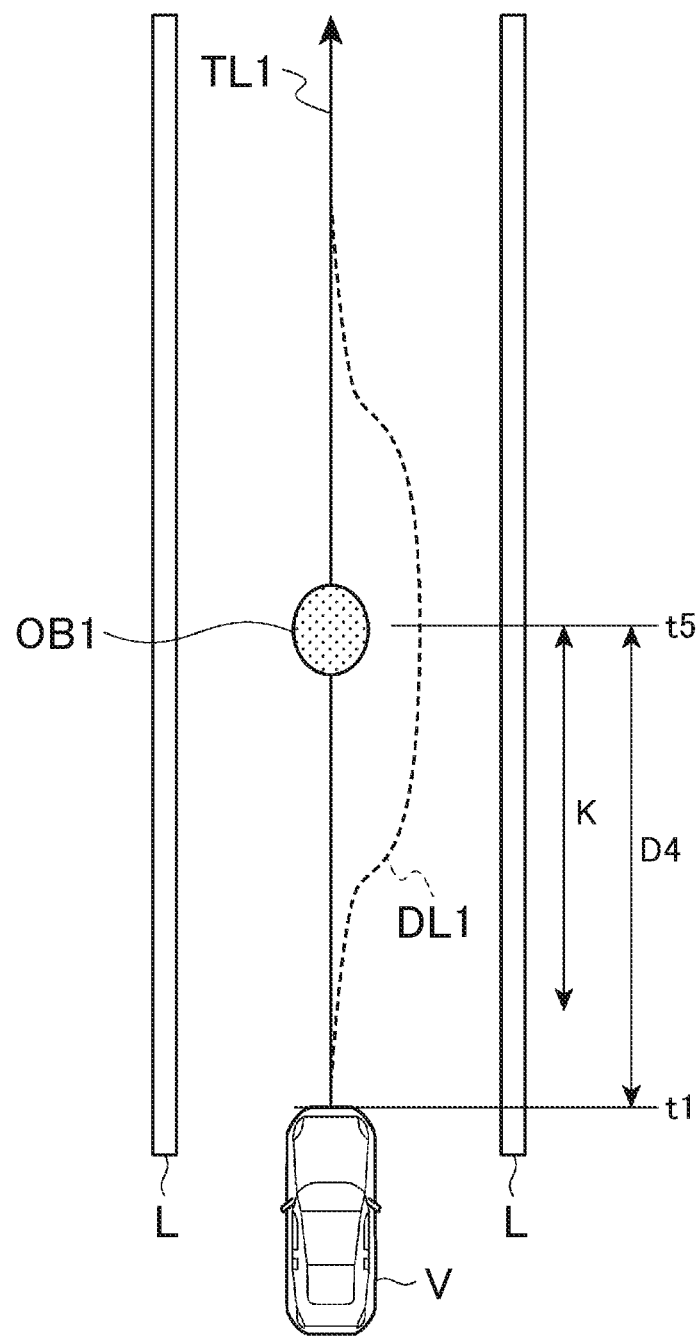
FIG. 9 is a diagram showing the outline of a temporary intervention via a steering operation.

Next, an example of the intervention operation in the steering control is described. FIG. 9 is a diagram showing the outline of a temporary intervention via the steering operation. FIG. 9 shows a traveling trajectory that is obtained when the target value is the target lateral position and there is an intervention via the steering operation. FIG. 9, which corresponds to the traveling scene shown in FIG. 2C, shows the case in which there is a temporary intervention for avoiding an obstacle OB1 ahead of the vehicle V. In FIG. 9, TL1 indicates the target trajectory based on the target lateral position, and DL1 indicates the actual traveling trajectory of the vehicle V. It is assumed that the driver performs the steering operation at time t1 and that this steering operation is determined to be an intervention. In this case, the steering control is interrupted at time t1. After that, it is assumed that the intervention is determined ended at t5. If the driver adjusts the lateral position temporarily, the amount of change in the lateral position of the vehicle V per unit time in the second determination period K becomes large (not equal to or smaller than the first lateral position threshold). Therefore, the vehicle traveling control device 10 determines that the traveling state of the vehicle V is not stable and, as a result, does not change the target trajectory TL1 obtained based on the target lateral position. After the intervention period D4 is ended, the vehicle traveling control device 10 restarts the steering control, using the target trajectory TL1 obtained based on the target lateral position before the intervention. After the steering control is restarted, the lateral position of the vehicle V gradually approaches the target lateral position. In this manner, in a traveling scene in which the driver adjusts the lateral position temporarily, the vehicle traveling control device 10 restarts the steering control, with the target lateral position unchanged from that before the intervention, thus allowing the travelling control to be restarted according to the driver's intention.

Figure 10:
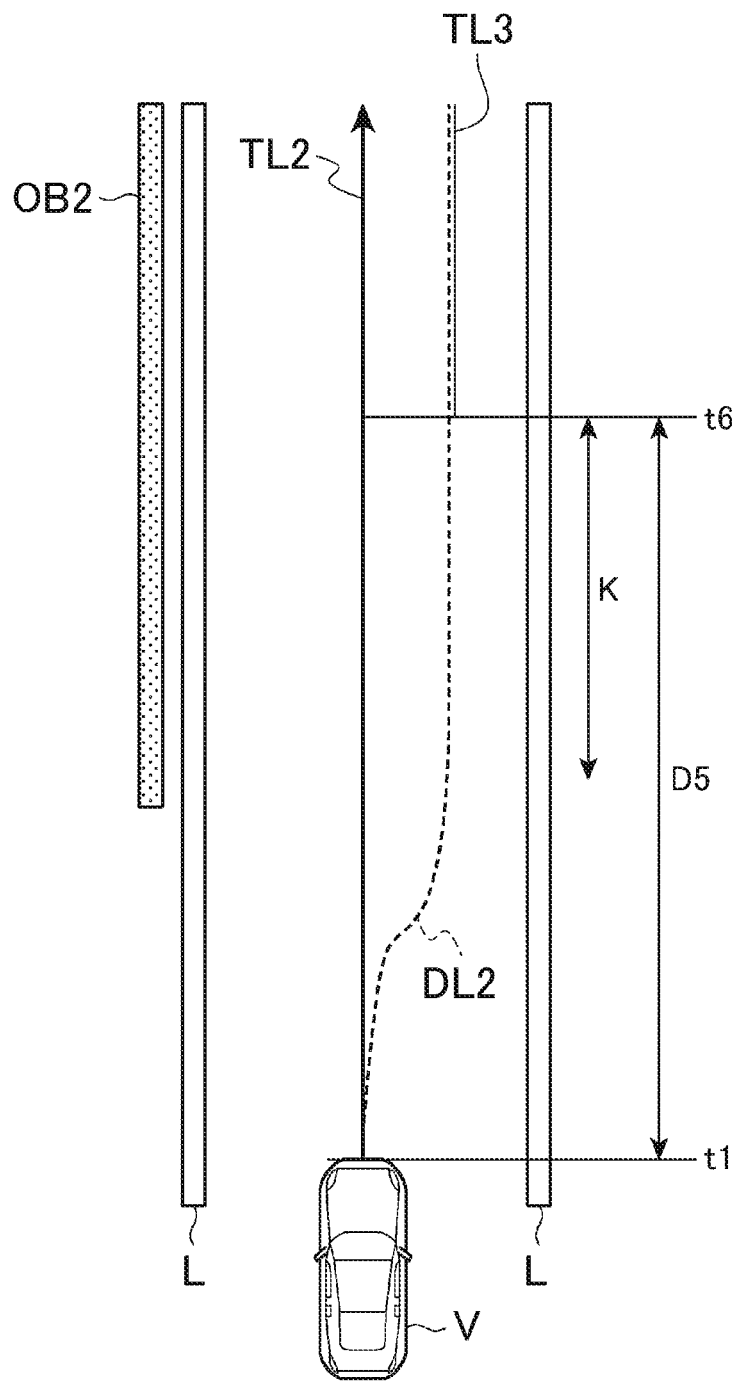
FIG. 10 is a diagram showing the outline of intervention via a driver's steering operation for changing the target lateral position.

Next, another example of the intervention operation in the steering control is described. FIG. 10 is a diagram showing the outline of an intervention via the steering operation for changing the target lateral position. FIG. 10 shows a traveling trajectory that is obtained when the target value is the target lateral position and there is an intervention via the steering operation. FIG. 10, which corresponds to the traveling scene shown in FIG. 2D, shows the case in which an intervention operation is performed to move away from a wall OB2 existing on the side of the traveling lane ahead of the vehicle V. In FIG. 10, TL2 indicates the target trajectory based on the target lateral position, and DL2 indicates the actual traveling trajectory of the vehicle V. It is assumed that the driver performs the steering operation at time t1 and that this steering operation is determined to be an intervention. In this case, the steering control is interrupted at time t1. After that, it is assumed that the intervention is determined ended at time t6. For example, at time t6, the intervention determination unit 17 determines that the intervention operation is ended if it is determined that the steering operation amount is equal to or smaller than the predetermined intervention end threshold and if it is determined, using the touch sensor of the steering wheel, that the driver removes the hands from the steering wheel. If the driver adjusts the lateral position to move away from the wall OB2 and then time t6 is reached while the vehicle V travels at that position for a while, the amount of change in the lateral position per unit time in the second determination period K becomes small (equal to or smaller than the first lateral position threshold). Therefore, the vehicle traveling control device 10 determines that the traveling state of the vehicle V is stable. In addition, the difference between the stabilized lateral position and the target lateral position is large (equal to or larger than the second lateral position threshold). Therefore, the vehicle traveling control device 10 corrects the target trajectory TL1, which is based on the target lateral position, to the target trajectory TL3 that maintains the lateral position of the vehicle V at time t6. After the intervention period D5 is ended, the vehicle traveling control device 10 restarts the steering control, using the target trajectory TL3 that is based on the corrected target lateral position. In this manner, in a traveling scene in which the driver adjusts the lateral position to a fixed position for a long time, the vehicle traveling control device 10 restarts the steering control with the target lateral position corrected, thus allowing the travelling control to be performed according to the driver's intention.

As described above, when the speed control is performed using the target speed, the target inter-vehicle distance, the speed of the vehicle V, and the inter-vehicle distance and, during that speed control, the driver performs an intervention operation (acceleration/deceleration operation), the vehicle traveling control device 10 in this embodiment determines which is to be changed by the intervention operation, either the speed of the vehicle V or the inter-vehicle distance. For example, if there is no preceding vehicle or if the speed difference between the vehicle V and the preceding vehicle is not equal to or smaller than the predetermined speed, it is estimated that the intervention operation is performed to change the speed of the vehicle V. Therefore, the candidate selection unit 19 selects the target speed as the correction candidate. If the speed difference between the vehicle V and the preceding vehicle is equal to or smaller than the predetermined speed, it is estimated that the intervention operation is performed to intentionally change the inter-vehicle distance. Therefore, the candidate selection unit 19 selects the target inter-vehicle distance as the correction candidate. In this way, when performing the speed control, this device can select the target speed or the target inter-vehicle distance, which corresponds respectively to the speed of the vehicle V or the inter-vehicle distance to be changed by the driver, as the correction candidate, based on the presence of a preceding vehicle and the speed difference between the vehicle V and a preceding vehicle.

If it is determined that the target speed is the correction candidate, the processing is performed as follows. If the change determination unit 20 determines that the amount of change in the speed of the vehicle V in the first determination period K, from the predetermined time before the end of the driver's intervention operation (acceleration/deceleration operation) to the end of the driver's intervention operation, is equal to or smaller than the first speed threshold and if the difference determination unit 21 determines that the difference between the speed of the vehicle V recognized when the driver's intervention operation is ended and the target speed is equal to or larger than the second speed threshold, the target correction unit 22 corrects the target speed to the speed of the vehicle V recognized when the intervention operation is ended. If the amount of change in the speed of the vehicle V in the first determination period K is equal to or smaller than the first speed threshold, it is estimated that the intervention operation is ended because the speed becomes the stable speed according to the driver's intention. If the difference between the stabilized speed and the target speed is equal to or larger than the second speed threshold, that difference means there is a difference between the speed of the vehicle V and the target speed. This means that, if the above condition is satisfied, it is estimated that the intervention operation is not a temporary intervention operation for avoiding an obstacle but is an intervention performed intentionally by the driver to change the target speed of the travelling control. Therefore, if the above condition is satisfied, this vehicle traveling control device 10 corrects the target speed to the speed of the vehicle V recognized when the driver's intervention operation is ended, allowing the speed control to be performed according to the driver's intention when the interrupted speed control is restarted.

On the other hand, if it is determined that the target inter-vehicle distance is the correction candidate, the processing is performed as follows. If the change determination unit 20 determines that the amount of change in the inter-vehicle distance in the first determination period K is equal to or smaller than the first inter-vehicle distance threshold and if the difference determination unit 21 determines that the difference between the inter-vehicle distance recognized when the driver's intervention operation is ended and the target inter-vehicle distance is equal to or larger than the second inter-vehicle distance threshold, the target correction unit 22 corrects the target inter-vehicle distance to the inter-vehicle distance recognized when the intervention operation is ended. If the amount of change in the inter-vehicle distance in the first determination period K is equal to or smaller than the first inter-vehicle distance threshold, it is estimated that the intervention operation is ended because the inter-vehicle distance becomes the stable inter-vehicle distance according to the driver's intention. If the difference between the stabilized inter-vehicle distance and the target inter-vehicle distance is equal to or larger than the second inter-vehicle distance threshold, that difference means that there is a difference between the inter-vehicle distance and the target inter-vehicle distance. This means that, if the above condition is satisfied, it is estimated that the intervention operation is not a temporary intervention operation for avoiding an obstacle but is an intervention performed intentionally by the driver to change the target inter-vehicle distance of the travelling control. Therefore, if the above condition is satisfied, this vehicle traveling control device 10 corrects the target inter-vehicle distance to the inter-vehicle distance recognized when the driver's intervention operation is ended, allowing the speed control to be performed according to the driver's intention when the interrupted speed control is restarted.

In addition, according to the vehicle traveling control device 10 in this embodiment, if the change determination unit 20 determines that the amount of change in the lateral position of the vehicle V in the second determination period K, from the predetermined time before the end of the driver's intervention operation (steering operation) to the end of the driver's intervention operation, is equal to or smaller than the first lateral position threshold and if the difference determination unit 21 determines that the difference between the lateral position recognized when the driver's intervention operation is ended and the target lateral position is equal to or larger than the second lateral position threshold, the target correction unit 22 corrects the target lateral position to the lateral position of the vehicle V recognized when the intervention operation is ended. If the amount of change in the lateral position of the vehicle V in the second determination period K is equal to or smaller than the first lateral position threshold, it is estimated that the intervention operation is ended because the lateral position becomes the stable lateral position according to the driver's intention. If the difference between the stabilized lateral position and the target lateral position is equal to or larger than the second lateral position threshold, that difference means that there is a difference between the lateral position of the vehicle V and the target lateral position. This means that, if the above condition is satisfied, it is estimated that the intervention operation is not a temporary intervention operation for avoiding an obstacle but is an intervention performed intentionally by the driver to change the target lateral position of the travelling control. Therefore, if the above condition is satisfied, this vehicle traveling control device 10 corrects the target lateral position to the lateral position of the vehicle V recognized when the driver's intervention operation is ended, allowing the steering control to be performed according to the driver's intention when the interrupted steering control is restarted.

While the embodiment of the present invention has been described, it is to be understood that the present invention is not limited to the embodiment above. The present invention may be implemented in a variety of modes in which various changes and modifications are added to the embodiment above based on the knowledge of those skilled in the art.

[Example of modification for determining the start and the end of an intervention operation] Although the intervention determination unit 17 uses the intervention start threshold to determine the start of an intervention operation in the above embodiment, the present invention is not limited to this determination method. The intervention determination unit 17 may also combine the determination described above, which is based on the intervention start threshold, and the determination, which is based on the detection result of the pressure sensor provided on the steering wheel or on the surface of the pedal, to determine the start of an intervention operation. For example, the intervention determination unit 17 may determine that an intervention operation is started if the operation amount is equal to or larger than the intervention start threshold and if the pressure sensor detects that the driver holds the steering wheel or the driver puts his or her foot on the pedal. This combination more accurately determines that an intervention operation is started. The end of an intervention operation may also be determined in a configuration similar to that used for determining the start of an intervention operation described above.

[Example of modification for determining the end of an intervention operation] The intervention determination unit 17 may use the difference between the value indicating the traveling state and the target value to determine the end of an intervention operation. For example, the intervention determination unit 17 may determine that an intervention operation is ended when the amount of change (differential value) in the difference between the value indicating the traveling state and the target value becomes equal to or smaller than a predetermined value. That is, the intervention determination unit 17 may determine that the intervention operation is ended when the difference between the value indicating the traveling state and the target value becomes constant. For example, for the steering control, the intervention determination unit 17 determines that the intervention operation is ended when the amount of change in the offset between the target lateral position and the lateral position of the vehicle V becomes equal to or smaller than a predetermined value. Similarly, for the speed control, the intervention determination unit 17 determines that the intervention operation is ended when the amount of change in the offset between the target speed and the speed of the vehicle V becomes equal to or smaller than a predetermined value. For example, when traveling on a curved road under the steering control, there is a traveling scene in which the lateral position of the vehicle V is changed via the driver's steering operation and, after that, the lateral position that has been changed is maintained via the driver's steering operation. According to this modification, when the amount of change in the offset between the target lateral position and the lateral position of the vehicle V becomes equal to or smaller than a predetermined value, the steering control may be restarted, with that lateral position as the target, without having to wait for the end of the steering operation that maintains the lateral position. Similarly, during the speed control on a sloped road, when the amount of change in the offset between the target speed and the speed of the vehicle V becomes equal to or smaller than a predetermined value, the speed control may be restarted with that speed as the target. In this case, too, the speed control may be restarted, with that speed as the target, without having to wait for the end of the pedal operation that maintains the speed. Therefore, the traveling control may be restarted according to the driver's intention.

To determine that the difference between the value indicating the traveling state and the target value is constant, the duration time of the intervention operation, the traveling distance via the intervention operation, the operation amount of the intervention operation, the operation speed and the operation acceleration, and the frequency may also be combined. These values may be predetermined values and may be corrected through a learning effect or based on big data.

[First modification example of the correction candidate determination processing] Although the embodiment above describes an example in which, for the speed control, the candidate selection unit 19 selects the correction candidate from the target speed and the target inter-vehicle distance based on the presence of a preceding vehicle and on the speed difference between the vehicle V and the preceding vehicle, the present invention is not limited to this selection method. For example, the candidate selection unit 19 may select the correction candidate of the target value based on the intervention duration time. This processing may be applied not only to the speed control but also to the steering control. For example, the candidate selection unit 19 counts the time, from the time the operation amount is detected to the time the operation amount is not detected, and determines the counting result as the intervention duration time. If the intervention duration time is equal to or larger than the threshold that is set in advance, the target value is selected as the correction candidate and, if the intervention duration time is not equal to or larger than the threshold that is set in advance, the target value is not selected as the correction candidate. When the correction candidate selection processing is based on the intervention duration time, the determination result based on this processing and the determination result of the candidate determination processing described in the embodiment may be combined or the processing based on this processing may be used alone without using the determination result of the candidate determination processing described in the embodiment. An example of the processing when the traveling control is the steering control is described below. It is assumed that D4 shown in FIG. 9 and D5 shown in FIG. 10 are the intervention duration time. It is also assumed that a predetermined threshold longer than the intervention duration time D4 and shorter than the intervention duration time D5 is set. In this case, the intervention control unit 18 determines that the intervention duration time D4 shown in FIG. 9 is not equal to or larger than the threshold and therefore, in the traveling scene shown in FIG. 9, the target lateral position is not selected as the correction candidate. On the other hand, in the traveling scene shown in FIG. 10, the intervention control unit 18 determines that the intervention duration time D5 shown in FIG. 10 is equal to or larger than the threshold. In this case, the target lateral position is selected as the correction candidate. The driver, who intends to change the target value, tends to have a longer intervention duration time. Therefore, using the intervention duration time can lead to an increase in the accuracy in estimating the driver's intention.

Figure 11:
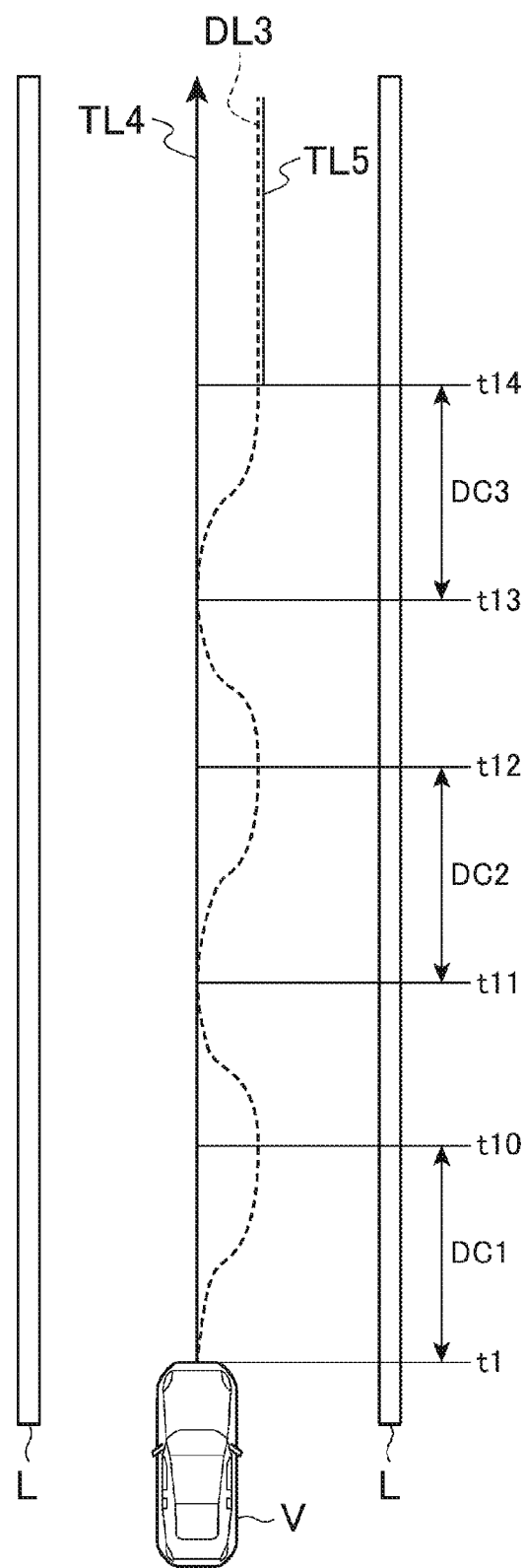
FIG. 11 is a diagram showing the correction of a target value using the number of driver's interventions.

[Second modification example of the correction candidate determination processing] The candidate selection unit 19 may select the correction candidate of the target value using the accumulated number of interventions. For example, if the number of interventions equal to or larger than the number-of-times determination threshold is detected, the intervention determination unit 17 may perform the processing for selecting the correction candidate of the target value. This processing may be applied not only to the speed control but also to the steering control. FIG. 11 is a diagram showing the correction of the target value using the number of driver's interventions. FIG. 11 shows the intervention periods DC1, DC2, and DC3 in which the driver's steering operation is performed. In FIG. 11, TL4 indicates the target trajectory based on the target lateral position, and DL3 indicates the actual traveling trajectory of the vehicle V. In this figure, the number-of-times determination threshold is three.

It is assumed that the steering operation is started at time t1 and is ended at time t10. In this case, in the intervention period DC1 from time t1 to time t10, the driver's operation is reflected on the traveling. After the intervention period DC1 is ended, the candidate selection unit 19 determines the accumulated number of interventions. The accumulated number of interventions, which is one immediately after the intervention period DC1 is ended, is not equal to or larger than the number-of-times determination threshold of three. Therefore, the candidate selection unit 19 does not select the target lateral position as the correction candidate, meaning that the steering control based on the target trajectory TL4 is restarted when the intervention period DC1 is ended.

Next, it is assumed that the steering operation is started at time t11 and is ended at time t12. In this case, in the intervention period DC2 from time t11 to time t12, the driver's operation is reflected on the traveling. After the intervention period DC2 is ended, the candidate selection unit 19 determines the accumulated number of interventions. The accumulated number of interventions, which is two immediately after the intervention period DC2 is ended, is not equal to or larger than the number-of-times determination threshold of three. Therefore, the candidate selection unit 19 does not select the target lateral position as the correction candidate, meaning that the steering control based on the target trajectory TL4 is restarted when the intervention period DC2 is ended.

Next, it is assumed that the steering operation is started at time t13 and is ended at time t14. In this case, in the intervention period DC3 from time t13 to time t14, the driver's operation is reflected on the traveling. After the intervention period DC3 is ended, the candidate selection unit 19 determines the accumulated number of interventions. The accumulated number of interventions, which is three immediately after the intervention period DC3 is ended, is equal to or larger than the number-of-times determination threshold of three. Therefore, the candidate selection unit 19 selects the target lateral position as the correction candidate. At this time, it is assumed that the amount of change in the lateral position of the vehicle V per unit time in the second determination period is determined equal to or smaller than the first lateral position threshold and that the difference between the lateral position of the vehicle V when the intervention period DC3 is ended and the target lateral position is determined equal to or larger than the second lateral position threshold. In this case, the target lateral position is changed, and the steering control is restarted based on the target trajectory TL5 when the intervention period DC3 is ended. Thus, the driver, who intends to change the target value, tends to intervene in the traveling control many times. Therefore, using the number of interventions can lead to an increase in the accuracy in estimating the driver's intention.

[Modification example of the effective period of a corrected target value] When the traveling control unit 16 restarts the travelling control using a corrected target value (target speed, target inter-vehicle distance, or target lateral position), the effective period of the corrected target value, though not provided in this embodiment, may be provided. For example, the traveling control unit 16 may provide the effective period of a corrected target based on the detection value of the touch sensor provided on the steering wheel or the pedal. For example, the traveling control unit 16 may set the effective period of a corrected target value to a period that is longer as the driver touches the steering wheel or the pedal longer. The traveling control unit 16 may also set the effective period of a corrected target value to a period that is longer as the time, from when the amount of change (differential value) in the difference between the recognized result (sensor value) and the target value becomes equal to or smaller than the predetermined value to when the detection amount detected by the operation amount detection sensor 5 becomes equal to or smaller than the threshold, is longer.

Figure 12:
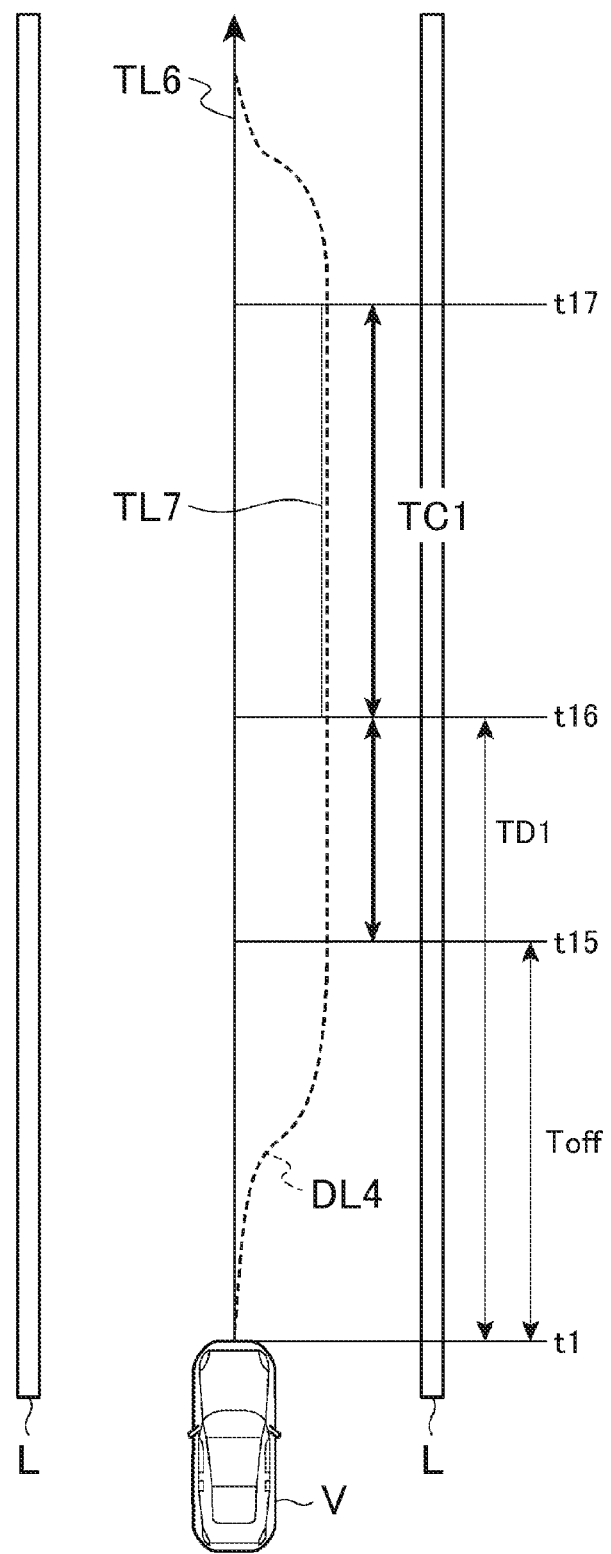
FIG. 12 is a diagram showing the effective period of a corrected target value.

FIG. 12 is a diagram showing the effective period of a corrected target value. In FIGS. 12, TL6 and TL7 indicate the target trajectory based on the target lateral position, and DL4 indicates the actual traveling trajectory of the vehicle V. It is assumed that the steering operation is started at time t1 and that the driver removes the hands from the steering wheel at time t15. When the intervention determination unit 17 uses the detection value of the touch sensor on the steering wheel to determine the end of the intervention, the period from time t1 to time t16 is the driver's intervention time TD1. It is assumed that the offset duration determination time $T_{off}$, used for determining that the offset is continued, is set. The operation, detected after the elapse of the offset duration determination time $T_{off}$, is considered as an intervention operation for maintaining the traveling state. That is, the period from time t15 to time t16 is a period $(TD1-T_{off})$ during which the driver keeps the hands on the steering wheel to maintain the traveling state. After that, it is assumed that the target lateral position is corrected at time t16 with the result that target trajectory is changed from TL6 to TL7. In this case, the traveling control unit 16 calculates the execution period TC1 of the target trajectory TL7 (that is, effective period of the corrected target value) using the following expression (1). $TC1=N \cdot (TD1-T_{off})$ ... (1), where N is a natural number. When the time reaches time t17 after the elapse of TC1, the traveling control unit 16 returns the target value to the target lateral position before the intervention because the effective period of the corrected target lateral position expires. Therefore, the target trajectory is corrected again from TL7 to TL6. The driver, who intends to change the target value, tends to perform the intervention operation for a long time to maintain the traveling state. Therefore, an effective period is set for the corrected target value and this effective period is made proportional to the intervention operation duration time for maintaining the traveling state. This allows the driver's intended travelling control to be performed for the length of a period according to the driver's intention after restarting the travelling control.

Example of Other Modifications (1) If a switching threshold, used to determine whether to switch to the manual driving, is set for an intervention operation, the intervention determination unit 17 is required to determine the start and the end of the intervention operation only in the range equal to or smaller than the switching threshold. (2) The flowchart shown in FIG. 4 is exemplary only, and the processing in S34 to S42 may be performed before the processing in S30 and S32. That is, whether the correction candidate is the correction candidate for the speed control may be determined first and, then, the correction candidate for the steering control may be determined. (3) The flowchart shown in FIG. 5 is exemplary only, and the processing in S50 and the processing S52 may be exchanged. The flowchart shown in FIG. 6 is exemplary only, and the processing in S60 and the processing S62 may be exchanged. The flowchart shown in FIG. 7 is exemplary only, and the processing in S70 and the processing S72 may be exchanged. (4) When the target value is corrected, the target correction unit 22 may inform the driver about the correction of the target value. When the target value is corrected, the target correction unit 22 may present two or more options to the driver. The target correction unit 22 may be configured to perform the correction according to the driver's reaction or response.

What is claimed is:

1. A vehicle traveling control device that performs traveling control of a vehicle, comprising:
    an other-vehicle recognition portion configured to recognize a presence of a preceding vehicle traveling in a traveling lane ahead of the vehicle;
    an external situation recognition portion configured to recognize a speed difference between the vehicle and the preceding vehicle and an inter-vehicle distance between the vehicle and the preceding vehicle when the other-vehicle recognition portion recognizes the preceding vehicle;
    a traveling state recognition portion configured to recognize a speed of the vehicle;
    a vehicle control portion configured to perform speed control of the vehicle using the speed of the vehicle and a target speed that is set in advance and using the inter-vehicle distance and a target inter-vehicle distance that is set in advance;
    an intervention determination portion configured to determine a start and an end of an intervention operation, performed by a driver of the vehicle, in the speed control;
    an intervention control portion configured to cause the vehicle control portion to interrupt the speed control when the intervention determination portion determines the start of the driver's intervention operation in the speed control, and causes the vehicle control portion to restart the speed control when the intervention determination portion determines the end of the driver's intervention operation in the speed control;
    a candidate selection portion configured to select a correction candidate from the target speed and the target inter-vehicle distance based on the presence of the preceding vehicle and on the speed difference between the vehicle and the preceding vehicle;
    a change determination portion configured to determine whether there is a change in the speed of the vehicle or there is a change in the inter-vehicle distance in a first determination period, the first determination period being a period from a predetermined time before the end of the driver's intervention operation in the speed control to the end of the driver's intervention operation in the speed control;
    a difference determination portion configured to determine whether there is a difference between the target speed and the speed of the vehicle when the driver's intervention operation in the speed control is ended or whether there is a difference between the target inter-vehicle distance and the inter-vehicle distance when the driver's intervention operation in the speed control is ended; and
    a target correction portion configured to correct the target speed or the target inter-vehicle distance, wherein
    if the candidate selection portion selects the target speed as the correction candidate,
    the change determination portion determines whether an amount of change in the speed of the vehicle in the first determination period is equal to or smaller than a first speed threshold, the difference determination portion determines whether a difference between the speed of the vehicle when the driver's intervention operation in the speed control is ended and the target speed is equal to or larger than a second speed threshold, and the target correction portion corrects the target speed to the speed of the vehicle when the driver's intervention operation in the speed control is ended if:
        the change determination portion determines that the amount of change in the speed of the vehicle in the first determination period is equal to or smaller than the first speed threshold, and if:
        the difference determination portion determines that the difference between the target speed and the speed of the vehicle when the driver's intervention operation in the speed control is ended is equal to or larger than the second speed threshold, and
    if the candidate selection portion selects the target inter-vehicle distance as the correction candidate,
    the change determination portion determines whether an amount of change in the inter-vehicle distance in the first determination period is equal to or smaller than a first inter-vehicle distance threshold, the difference determination portion determines whether a difference between the target inter-vehicle distance and the inter-vehicle distance when the driver's intervention operation in the speed control is ended is equal to or larger than a second inter-vehicle distance threshold, and the target correction portion corrects the target inter-vehicle distance to the inter-vehicle distance when the driver's intervention operation in the speed control is ended if:
        the change determination portion determines that the amount of change in the inter-vehicle distance in the first determination period is equal to or smaller than the first inter-vehicle distance threshold, and if:
        the difference determination portion determines that the difference between the inter-vehicle distance when the driver's intervention operation in the speed control is ended and the target inter-vehicle distance is equal to or larger than the second inter-vehicle distance threshold, and
    if the intervention determination portion determines that the driver's intervention operation in the speed control is ended,
    the vehicle control portion restarts the speed control using the target speed or the target inter-vehicle distance corrected by the target correction portion.

2. The vehicle traveling control device according to claim 1, wherein the external situation recognition portion acquires positions of lane lines that are boundaries of the traveling lane of the vehicle, the traveling state recognition portion recognizes a lateral position of the vehicle in the traveling lane, the vehicle control portion performs steering control using the lateral position of the vehicle and a target lateral position that is set in advance, the intervention determination portion determines a start and an end of an intervention operation, performed by the driver of the vehicle, in the steering control, the intervention control portion causes the vehicle control portion to interrupt the steering control when the intervention determination portion determines the start of the driver's intervention operation in the steering control, and causes the vehicle control portion to restart the steering control when the intervention determination portion determines the end of the driver's intervention operation in the steering control, and the candidate selection portion selects the target lateral position as the correction candidate based on the start of the intervention operation in the steering control, and after the candidate selection portion selects the target lateral position as the correction candidate, the change determination portion determines whether an amount of change in the lateral position of the vehicle in a second determination period is equal to or smaller than a first lateral position threshold, the second determination period being a period from a predetermined time before the end of the driver's intervention operation in the steering control to the end of the driver's intervention operation in the steering control, and the difference determination portion determines whether a difference between the target lateral position and the lateral position of the vehicle when the driver's intervention operation in the steering control is ended is equal to or larger than a second lateral position threshold, and the target correction portion corrects the target lateral position to the lateral position of the vehicle when the driver's intervention operation in the steering control is ended if:

the change determination portion determines that the amount of change in the lateral position of the vehicle in the second determination period is equal to or smaller than the first lateral position threshold, and if the difference determination portion determines that the difference between the target lateral position and the lateral position of the vehicle when the driver's intervention operation in the steering control is ended is equal to or larger than the second lateral position threshold, and if the intervention determination portion determines that the driver's intervention operation in the steering control is ended, the vehicle control portion restarts the steering control using the target lateral position corrected by the target correction portion.

3. A vehicle traveling control device that performs traveling control of a vehicle, comprising:

an external sensor that detects an external situation that is surrounding information on the vehicle;

an internal sensor that detects information according to a traveling state of the vehicle;

an actuator that performs traveling control of the vehicle; and an ECU configured to:

recognize a presence of a preceding vehicle traveling in a traveling lane ahead of the vehicle based on the external situation detected by the external sensor, recognize a speed difference between the vehicle and the preceding vehicle and an inter-vehicle distance between the vehicle and the preceding vehicle when the preceding vehicle is recognized, recognize a speed of the vehicle based on the information detected by the internal sensor, perform speed control of the vehicle using the actuator based on the speed of the vehicle and a target speed that is set in advance, and on the inter-vehicle distance and a target inter-vehicle distance that is set in advance, determine a start and an end of an intervention operation, performed by a driver of the vehicle, in the speed control, interrupt the speed control when it is determined that the driver's intervention operation in the speed control is started, and restart the speed control when it is determined that the driver's intervention operation in the speed control is ended;

select a correction candidate from the target speed and the target inter-vehicle distance, based on the presence of the preceding vehicle and on the speed difference between the vehicle and the preceding vehicle, determine whether there is a change in the speed of the vehicle or whether there is a change in the inter-vehicle distance in a first determination period, the first determination period being a period from a predetermined time before the end of the driver's intervention operation in the speed control to the end of the driver's intervention operation in the speed control, determine whether there is a difference between the target speed and the speed of the vehicle when the driver's intervention operation in the speed control is ended or whether there is a difference between the target inter-vehicle distance and the inter-vehicle distance when the driver's intervention operation in the speed control is ended, and correct the target speed or the target inter-vehicle distance, wherein if the target speed is selected as the correction candidate, the ECU determines whether an amount of change in the speed of the vehicle in the first determination period is equal to or smaller than a first speed threshold, determines whether the difference between the speed of the vehicle when the driver's intervention operation in the speed control is ended and the target speed is equal to or larger than a second speed threshold, and corrects the target speed to the speed of the vehicle when the driver's intervention operation in the speed control is ended if:

it is determined that the amount of change in the speed of the vehicle in the first determination period is equal to or smaller than the first speed threshold, and if it is determined that the difference between the target speed and the speed of the vehicle when the driver's intervention operation in the speed control is ended is equal to or larger than the second speed threshold, and if the target inter-vehicle distance is selected as the correction candidate, the ECU determines whether an amount of change in the inter-vehicle distance in the first determination period is equal to or smaller than a first inter-vehicle distance threshold, determines whether a difference between the target inter-vehicle distance and the inter-vehicle distance when the driver's intervention operation in the speed control is ended is equal to or larger than a second inter-vehicle distance threshold, and corrects the target inter-vehicle distance to the inter-vehicle distance when the driver's intervention operation in the speed control is ended if:
  it is determined that the amount of change in the inter-vehicle distance in the first determination period is equal to or smaller than the first inter-vehicle distance threshold, and if
  it is determined that the difference between the inter-vehicle distance when the driver's intervention operation in the speed control is ended and the target inter-vehicle distance is equal to or larger than the second inter-vehicle distance threshold, and
if it is determined that the driver's intervention operation in the speed control is ended,
the ECU causes the actuator to restart the speed control using the corrected target speed or the corrected target inter-vehicle distance corrected.

\* \* \* \* \*